United States Patent
Feria et al.

(10) Patent No.: US 10,200,109 B2
(45) Date of Patent: Feb. 5, 2019

(54) SYSTEM AND METHOD FOR DISTRIBUTED WIRELESS COMMUNICATIONS

(71) Applicant: The Boeing Company, Chicago, IL (US)

(72) Inventors: Ying J. Feria, Manhattan Beach, CA (US); David A. Whelan, Newport Coast, CA (US); Greg Busche, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 15/142,267

(22) Filed: Apr. 29, 2016

(65) Prior Publication Data

US 2017/0317742 A1 Nov. 2, 2017

(51) Int. Cl.
*H04B 7/185* (2006.01)
*H04L 5/00* (2006.01)
*H04W 16/28* (2009.01)

(52) U.S. Cl.
CPC ....... *H04B 7/18504* (2013.01); *H04L 5/0023* (2013.01); *H04W 16/28* (2013.01)

(58) Field of Classification Search
CPC ...... H04W 52/46; H04W 84/06; H04W 88/04
See application file for complete search history.

(56) References Cited

U.S. PATENT DOCUMENTS

| 6,154,501 A | 11/2000 | Friedman |
| 6,993,288 B2 | 1/2006 | de La Chapelle et al. |
| 7,103,317 B2 * | 9/2006 | Chang ............ H01Q 1/007 370/316 |
| 7,415,074 B2 | 8/2008 | Seto et al. |
| 7,499,393 B2 | 3/2009 | Ozluturk |
| 8,180,341 B2 | 5/2012 | Hibbs et al. |
| 8,897,770 B1 | 11/2014 | Frolov et al. |
| 8,948,747 B2 | 2/2015 | Feria et al. |
| 2002/0154608 A1 * | 10/2002 | Chockalingam ..... H04B 7/2606 370/311 |
| 2007/0015460 A1 | 1/2007 | Karabinis et al. |
| 2010/0022238 A1 * | 1/2010 | Kim .................. H04B 7/0669 455/427 |
| 2014/0241239 A1 | 8/2014 | Chang |
| 2014/0273815 A1 * | 9/2014 | Jayasimha ......... H04B 7/18521 455/13.2 |
| 2016/0337230 A1 * | 11/2016 | Emmanuel ........ H04W 28/0215 |

(Continued)

OTHER PUBLICATIONS

Feihong Dong et al., "System Capacity Analysis on Constellation of Interconnected HAP Networks," IEEE Fifth International Conference on Big Data and Cloud Computing (2015).

(Continued)

*Primary Examiner* — Kan Yuen
(74) *Attorney, Agent, or Firm* — Walters & Wasylyna LLC

(57) ABSTRACT

A communications system includes radio frequency equipment to generate a forward link configured for wireless transmissions of a base-to-user data stream from a plurality of airborne communications relay platforms to at least one user terminal, wherein the forward link includes a plurality of relay-to-user links, each one of the plurality of relay-to-user links includes a relay-to-user radio frequency signal encoded with a different base-to-user data sub-stream.

20 Claims, 12 Drawing Sheets

(56) References Cited

U.S. PATENT DOCUMENTS

2017/0078978 A1* 3/2017 Scipione ............... H04W 52/18
2017/0163452 A1* 6/2017 Breiling ............ H04L 25/03159

OTHER PUBLICATIONS

M. Petermann et al., "Iterative Pre-Compensation of I/Q Imbalances in an Adaptive 2.4 GHz MIMO-OFDM System" Smart Antennas 2010 International ITG Workshop (2010).
European Patent Office, Extended European Search Report, Application No. EP 17 16 8517, (dated Sep. 28, 2017).

* cited by examiner

SYSTEM AND METHOD FOR DISTRIBUTED WIRELESS COMMUNICATIONS

FIELD

The present disclosure is generally related to wireless communications and, more particularly, to a system and method for distributed wireless communications between base stations and user terminals through high altitude communications relays.

BACKGROUND

Modern wireless communications systems and network depend on aerial communications platforms (e.g., aircraft or space vehicles) to route communications (e.g., transmit and receive information) between ground based base stations and user terminals. The aerial communications platform may employ a number of signal beams (e.g., spot beams) providing a beam pattern that forms a coverage area over a large geographic region that may be divided into a plurality of smaller service areas.

Because of the limit of frequency resources available for over-the-air transmission, various communications schemes may be used to provide a greater number of communication signals within an allocated frequency band, while still attempting to reduce the payload required on the aerial communications platform.

Accordingly, those skilled in the art continue with research and development efforts in the field of wireless communication networks.

SUMMARY

In one embodiment, the disclosed communications system includes radio frequency equipment to generate a forward link configured for wireless transmissions of a base-to-user data stream from a plurality of airborne communications relay platforms to at least one user terminal, wherein the forward link includes a plurality of relay-to-user links, each one of the plurality of relay-to-user links includes a relay-to-user radio frequency signal encoded with a different base-to-user data sub-stream.

In another embodiment, the disclosed communications system includes a plurality of airborne communications relay platforms for wireless communication of a base-to-user data stream, and a user terminal in wireless communication with the plurality of communications relay platforms over a plurality of relay-to-user links, each one of said plurality of relay-to-user links including a relay-to-user radio frequency signal encoded with a different base-to-user data sub-stream.

In yet another embodiment, the disclosed method includes the steps of: (1) generating a forward link configured for wireless transmission of a base-to-user data stream from a plurality of airborne communications relay platforms to at least one user terminal, wherein the forward link includes a plurality of relay-to-user links, each one of the plurality of relay-to-user links includes a relay-to-user radio frequency signal encoded with a different base-to-user data sub-stream, (2) transmitting, from the plurality of communications relay platforms, a plurality of relay-to-user radio frequency signals, and (3) receiving, by the user terminal, the plurality of relay-to-user radio frequency signals.

Other embodiments of the disclosed system, apparatus and method will become apparent from the following detailed description, the accompanying drawings and the appended claims.

DETAILED DESCRIPTION

Figure 1:
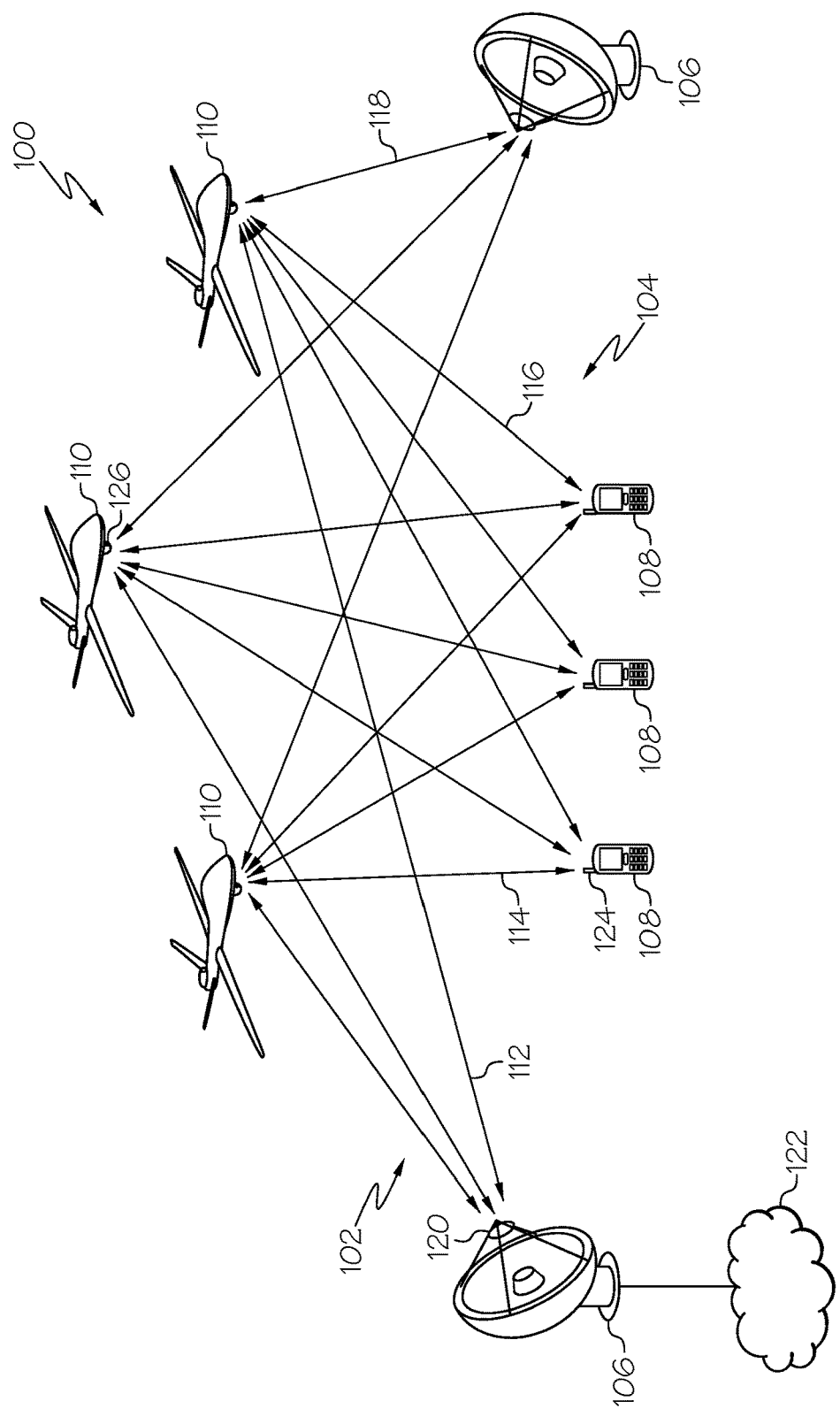
FIG. 1 is a schematic illustration of one embodiment of the disclosed communications system.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

In FIGS. 2-4, 9-11, 15 and 22 referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 2-4, 9-11, 15 and 22 may be combined in various ways without the need to include other features described in FIGS. 2-4, 9-11, 15 and 22, other drawing figures, and/or the accompanying disclosure, even though such combination or combinations are not explicitly illustrated herein. Similarly, additional features not limited to the examples presented, may be combined with some or all of the features shown and described herein.

In FIGS. 16-21, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 16-21 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "embodiment" means that one or more feature, structure, element, component or characteristic described in connection with the embodiment is included in at least one embodiment or implementation. Thus, the phrase "in one embodiment," "in another embodiment," and similar language throughout the present disclosure may, but do not necessarily, refer to the same embodiment. Further, the subject matter characterizing any one embodiment may, but does not necessarily, include the subject matter characterizing any other embodiment.

Illustrative, non-exhaustive embodiments, which may be, but are not necessarily, claimed, of the subject matter according the present disclosure are provided below.

Referring to FIG. 1, one embodiment of a communications system 100 is disclosed. The communications system 100 includes a forward link 102 (or a plurality of forward links 102) and a return link 104 (or a plurality of return links 104). The forward link 102 (also referred to as a downlink) is a communications path for the wireless transmission of data from a base station 106 (or a plurality of base stations 106) to a user terminal 108 (or a plurality of user terminals 108). The return link 104 (also referred to as an uplink) is a communications path for the wireless transmission of data (the data stream) from the user terminal 108 (or the plurality of user terminals 108) to the base station 106 (or the plurality of base stations 106).

The forward link 102 transmits data from one or more of the base stations 106 through a plurality of airborne (e.g., high altitude) communications relay platforms 110 (generally referred to herein as relay platforms 110) to one or more of the user terminals 108. Similarly, the return link 104 transmits data from one or more user terminals 108 through the plurality of relay platforms 110 to one or more of the base stations 106.

In one embodiment, the forward link 102 includes at least two base-to-relay (BTR) links 112 (only one of the BTR links 112 is explicitly identified in FIG. 1). The BTR link 112 is a communications path for the wireless transmission of data from the base station 106 to a relay platform 110. The forward link 102 also includes at least two relay-to-user (RTU) links 114 (only one of the RTU links 114 is explicitly identified in FIG. 1). The RTU link 114 is a communications path for the wireless transmission of data from the relay platform 110 to the user terminal 108.

Conversely, in one embodiment, the return link 104 includes at least one user-to-relay (UTR) link 116 (only one of the UTR links 116 is explicitly identified in FIG. 1). The UTR link 116 is a communications path for the wireless transmission of data from the user terminal 108 to the relay platform 110. The return link 104 also includes at least one relay-to-base (RTB) link 118 (only one of the RTB links 118 is explicitly identified in FIG. 1). The RTB link 118 is a communications path for the wireless transmission of data from the relay platform 110 to the base station 106.

As one example, one or more of the base stations 106 (e.g., each base station 106) communicates with one or more of the relay platforms 110 (e.g., each relay platform 110) over the BTR link 112. As one example, one or more of the relay platforms 110 (e.g., each relay platform 110) communicates with one or more of the user terminals 108 (e.g., each one of the user terminals 108) over the RTU link 114. As one example, one or more of the user terminals 108 (e.g., each one of the user terminals 108) communicates with one or more of the relay platforms 110 (e.g., each relay platform 110) over the UTR link 116. As one example, one or more of the relay platforms 110 (e.g., each relay platform 110) communicates with one or more of the base stations 106 (e.g., each base station 106) over the RTB link 118.

Figure 2:
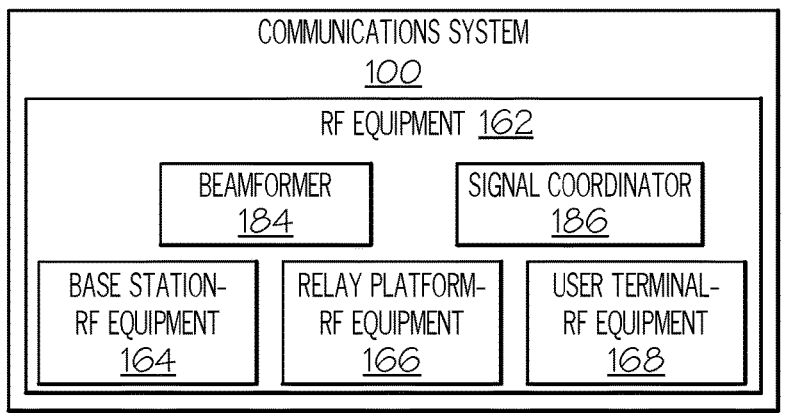
FIG. 2 is a schematic block diagram of another embodiment of the disclosed communications system.

Referring to FIG. 2, in one embodiment, the communications system 100 includes radio frequency electromagnetic radiation (RF) equipment 162. The RF equipment 162 enables and controls the forward and return RF communication between the base station 106, the relay platform 110 and the user terminal 108. For example, the RF equipment 162 is configured to process, generate, transmit and/or receive RF signals in order to communicate data or other information.

Figure 7:
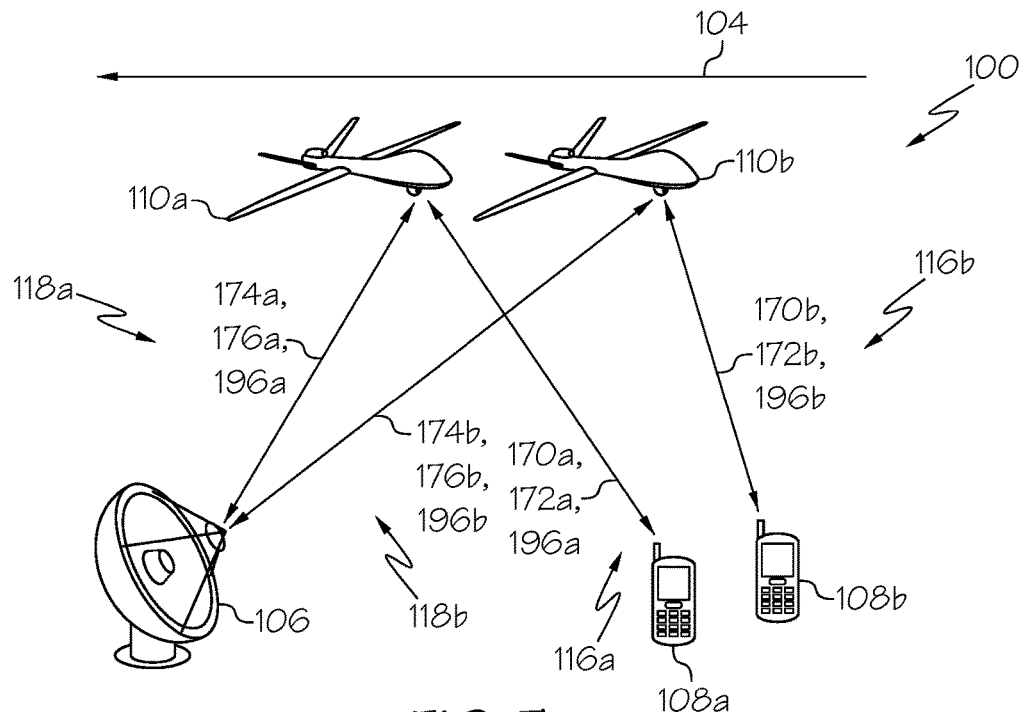
FIG. 7 is a schematic illustration of another embodiment of the return link of the disclosed communications system.
Figure 8:
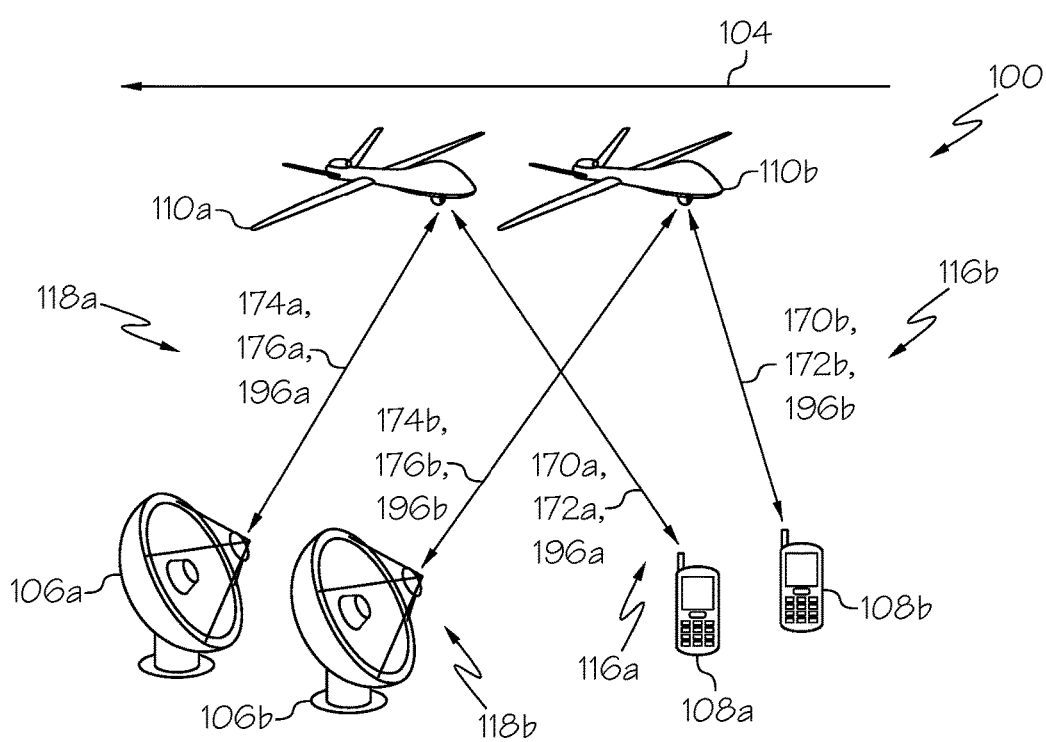
FIG. 8 is a schematic illustration of another embodiment of the return link of the disclosed communications system.
Figure 9:
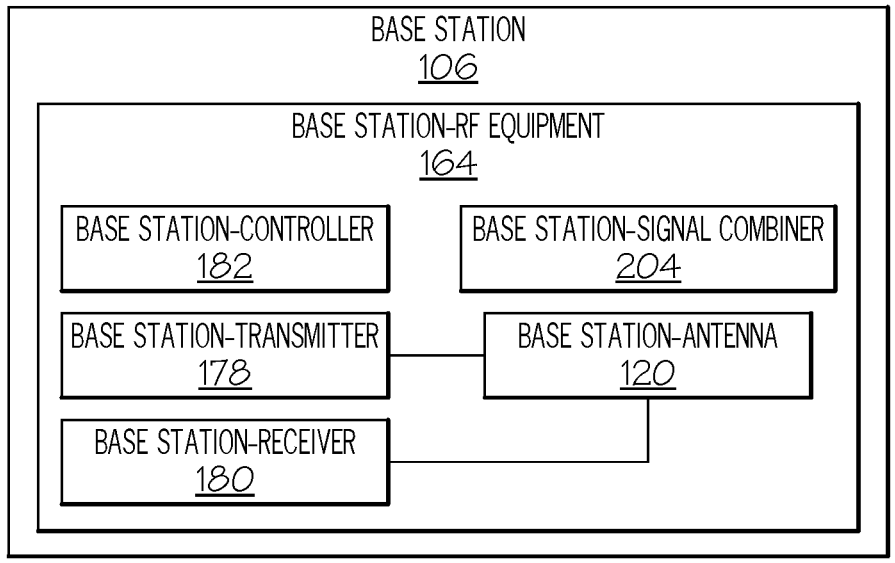
FIG. 9 is a schematic block diagram of one embodiment of a base station of the disclosed communications system.

Referring to FIG. 2, and with reference to FIGS. 7, 8 and 9, in various embodiments, the RF equipment 162 is distributed among the base station 106, the relay platform 110 and the user terminal 108. For example, the RF equipment 162 includes base station-RF equipment 164 located on (e.g., integrated within) or implemented by the base station 106, relay platform-RF equipment 166 located on (e.g., integrated within) or implemented by the relay platform 110 and user terminal-RF equipment 168 located on (e.g., integrated within) or implemented by the user terminal 108.

Figure 3:
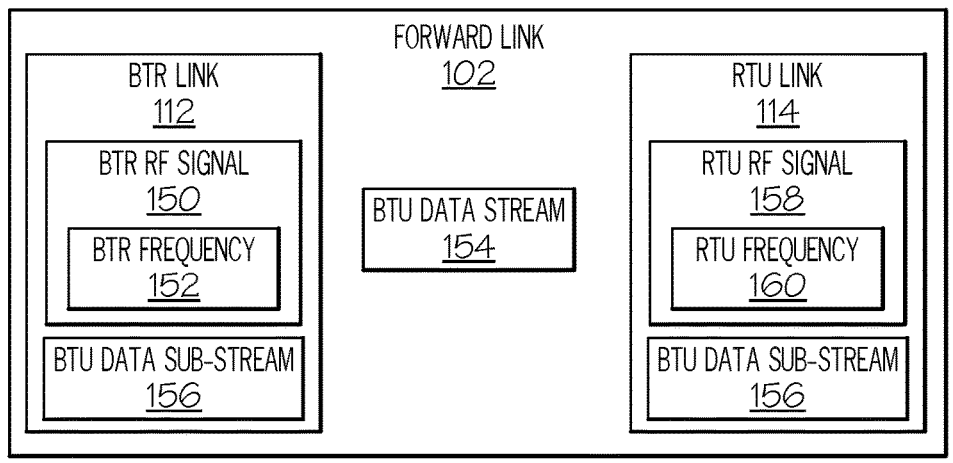
FIG. 3 is a schematic block diagram of one embodiment of a forward link of the disclosed communications system.
Figure 5:
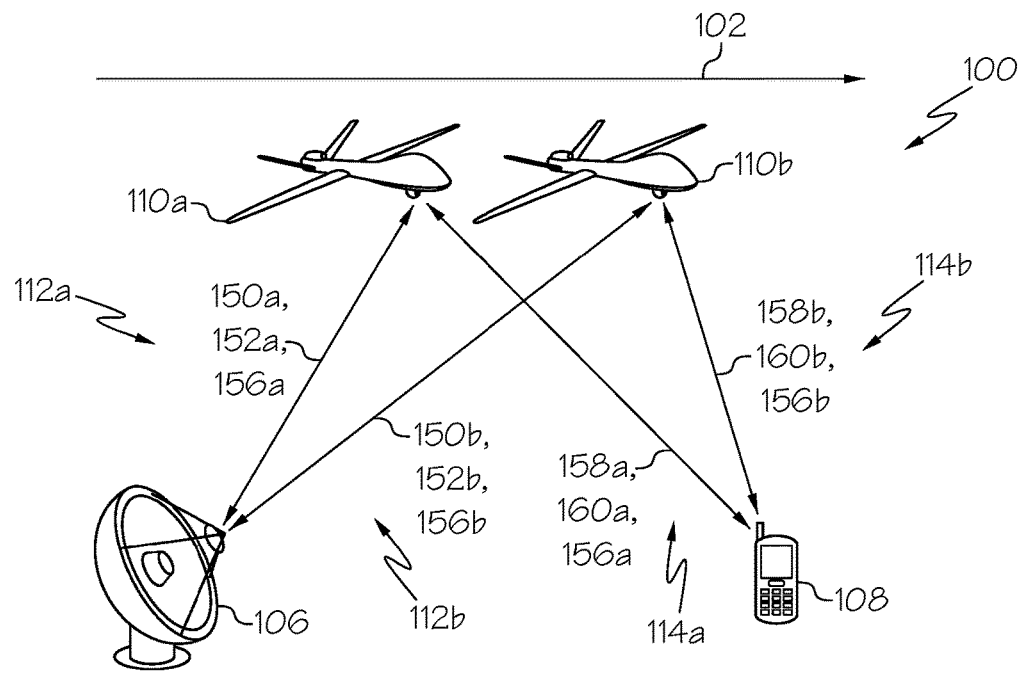
FIG. 5 is a schematic illustration of another embodiment of the forward link of the disclosed communications system.
Figure 6:
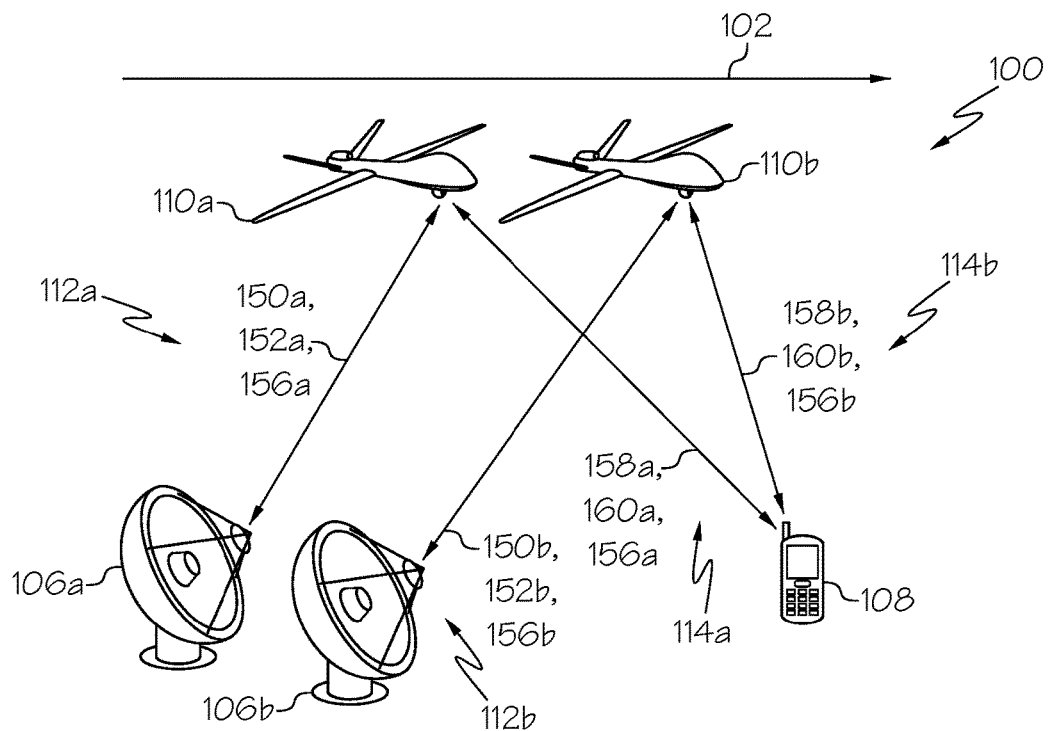
FIG. 6 is a schematic illustration of another embodiment of the forward link of the disclosed communications system.

Referring to FIG. 3, and with reference to FIGS. 1, 5 and 6, the forward link 102 transmits a base-to-user (BTU) data stream 154 from one or more base stations 106 to one or more user terminals 108 through two or more of the relay platforms 110. The BTU data stream 154 is converted into a plurality of BTU data sub-streams 156. Each one of the BTU data sub-streams 156 represents a portion of an entire BTU data stream 154 that is transmitted along the forward link 102. For example, the BTU data stream 154 is split into at least two BTU data sub-streams 156 (e.g., multiple transmission streams). Each one of the plurality of BTU data sub-streams 156 is transmitted to one relay platform 110 via one BTR link 112. Each one of the plurality of BTU data sub-streams 156 is then transmitted to the user terminal 108 via one RTU link 114. Thus, the BTU data stream 154 is received by the user terminal 108 via a plurality of the RTU links 114. Accordingly, the disclosed communications system 100 increases a data transmission capacity and data transfer speeds from the base station 106 to the user terminal 108.

The BTR link 112 includes (is formed by) a base-to-relay (BTR) radio frequency (RF) signal 150. The BTR RF signal 150 includes a base-to-relay (BTR) frequency 152 (e.g., an operating frequency, channel or band). The BTR RF signal 150 carries the BTU data sub-stream 156. As one example, the BTR RF signal 150 is encoded (e.g., by modulating the BTR frequency 152) with the BTU data sub-stream 156. Thus, the base station 106 transmits the BTU data sub-stream 156 via the BTR RF signal 150 to the relay platform 110.

The RTU link 114 includes (is formed by) a relay-to-user (RTU) RF signal 158. The RTU RF signal 158 includes a relay-to-user (RTU) frequency 160 (e.g., an operating frequency, channel or band). The RTU RF signal 158 carries the BTU data sub-stream 156. As one example, the RTU RF signal 158 is encoded (e.g., by modulating the RTU frequency 160) with the BTU data sub-stream 156. Thus, the relay platform 110 transmits the BTU data sub-stream 156 via the RTU RF signal 158 to the user terminal 108.

In one embodiment, the relay platform 110 serves as a single operation relay between the base station 106 and the user terminal 108. For example, the relay platform 110 (e.g., the relay platform-RF equipment 166) receives the BTR RF signal 150 (encoded with the BTU data sub-stream 156) and transmits (e.g., relays) the BTR RF signal 150 to the user terminal 108. In another embodiment, the relay platform 110 serves as a multi-operation relay between the base station 106 and the user terminal 108. For example, the relay platform 110 (e.g., the relay platform-RF equipment 166) receives the BTR RF signal 150 (encoded with the BTU data sub-stream 156). The relay platform 110 then processes the BTR RF signal 150, for example, by decoding the BTU data sub-stream 156 from the BTR RF signal 150 and encoding the RTU RF signal 158 with the BTU data sub-stream 156. The relay platform 110 then transmits the RTU RF signal 158 (encoded with the BTU data sub-stream 156) to the user terminal 108.

Figure 4:
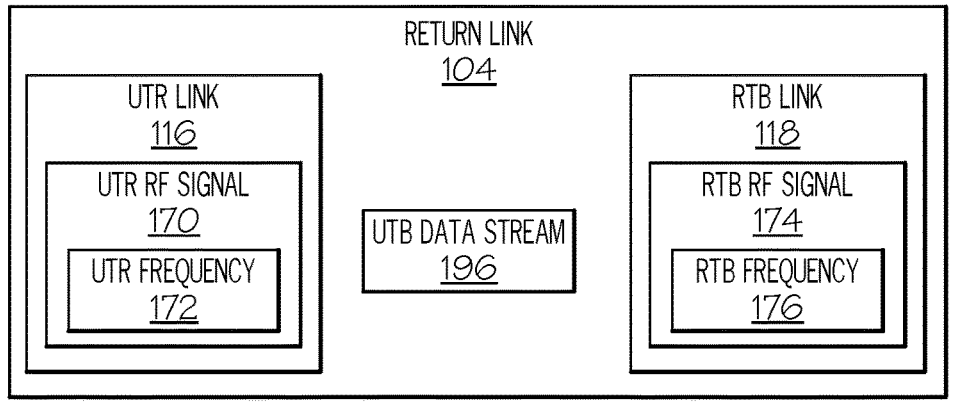
FIG. 4 is a schematic block diagram of one embodiment of a return link of the disclosed communications system.

Referring to FIG. 4, and with reference to FIGS. 1, 7 and 8, the return link 104 transmits a user-to-base (UTB) data stream 196 from one or more user terminals 108 to one or more base stations 107 through two or more of the relay platforms 110. Since the UTB data stream 196 is substantially smaller than the BTU data stream 154 (FIG. 3), in an exemplary embodiment, the entire UTB data stream 196 is carried by one UTR link 116 and one RTB link 118. For example, the UTB data stream 196 is transmitted to one relay platform 110 via one UTR link 116. The UTB data stream 196 is then transmitted to the base station 106 via one RTB link 118.

The UTR link 116 includes (is formed by) a user-to-relay (UTR) RF signal 170. The UTR RF signal 170 includes a user-to-relay (UTR) frequency 172 (e.g., an operating frequency, channel or band). The UTR RF signal 170 carries the UTB data stream 196. As one example, the UTR RF signal 170 is encoded (e.g., by modulating the UTR frequency 172) with the UTB data stream 196. Thus, the user terminal 108 transmits the UTB data stream 196 via the UTR RF signal 170 to the relay platform 110.

The RTB link 118 includes (is formed by) a relay-to-base (RTB) RF signal 174. The RTB RF signal 174 includes a relay-to-base (RTB) frequency 176 (e.g., an operating frequency, channel or band). The RTB RF signal 174 carries the UTB data stream 196. As one example, the RTB RF signal 174 is encoded (e.g., by modulating the RTB frequency 176) with the UTB data stream 196. Thus, the relay platform 110 transmits the UTB data stream 196 via the RTB RF signal 174 to the base station 106.

In one embodiment, the relay platform 110 serves as a single operation relay between the user terminal 108 and the base station 106. For example, the relay platform 110 (e.g., the relay platform-RF equipment 166) receives the UTR RF signal 170 (encoded with the UTB data stream 196) and transmits (e.g., relays) the UTR RF signal 170 to the base station 106. In another embodiment, the relay platform 110 serves as a multi-operation relay between the user terminal 108 and the base station 106. For example, the relay platform 110 (e.g., the relay platform-RF equipment 166) receives the UTR RF signal 170 (encoded with the UTB data stream 196). The relay platform 110 then processes the UTR RF signal 170, for example, by decoding the UTB data stream 196 from the UTR RF signal 170 and encoding the RTB RF signal 174 with the UTB data stream 196. The relay platform 110 then transmits the RTB RF signal 174 (encoded with the UTB data stream 196) to the base station 106.

FIG. 5 illustrates one example of the forward link 102 of the communications system 100 including one base station 106, a plurality of relay platforms 110 and one user terminal 108. In the illustrated example, the base station 106 communicates with two relay platforms 110 (e.g., a first relay platform 110a and a second relay platform 110b) over two BTR links 112 (e.g., a first BTR link 112a and a second BTR link 112b). Each one of the relay platforms 110 (e.g., the first relay platform 110a and the second relay platform 110b) communicates with the user terminal 108 over two RTU links 114 (e.g., a first RTU link 114a and a second RTU link 114b).

FIG. 6 illustrates another example of the forward link 102 of the communications system 100 including two base stations 106 (e.g., a first base station 106a and a second base station 106b). Each of the base stations 106 communicates with one of the two relay platforms 110 (e.g., the first relay platform 110a or the second relay platform 110b) over the two BTR links 112 (e.g., the first BTR link 112a and the second BTR link 112b). Each one of the relay platforms 110 communicates with the user terminal 108 over the two RTU links 114 (e.g., the first RTU link 114a and the second RTU link 114b).

FIG. 7 illustrates one example of the return link 104 of the communications system 100 including a plurality of user terminals 108, a plurality of relay platforms 110 and one base station 106. In the illustrated example, each of the user terminals 108 (e.g., a first user terminal 108a and a second user terminal 108b) communicates with an associated one of the relay platforms 110 (e.g., the first relay platform 110a and the second relay platform 110b) over two UTR links 116 (e.g., a first UTR link 116a and a second UTR link 116b). Each one of the relay platforms 110 (e.g., the first relay platform 110a and the second relay platform 110b) communicates with the base station 106 over two RTB links 118 (e.g., a first RTB link 118a and a second RTB link 118b).

FIG. 8 illustrates another example of the return link 104 of the communications system 100 including a plurality of user terminals 108, a plurality of relay platforms 110 and a plurality of base stations 106. In the illustrated example, each of the user terminals 108 (e.g., the first user terminal 108a and the second user terminal 108b) communicates with an associated one of the relay platforms 110 (e.g., the first relay platform 110a and the second relay platform 110b) over the two UTR links 116 (e.g., the first UTR link 116a and the second UTR link 116b). Each one of the relay platforms 110 (e.g., the first relay platform 110a and the second relay platform 110b) communicates with one of the base stations 106 (e.g., the first base station 106a and the second base station 106b) over the two RTB links 118 (e.g., a first RTB link 118a and a second RTB link 118b).

Referring to FIG. 9, and with reference to FIG. 1, in one embodiment, the base station 106 (e.g., the base station-RF equipment 164) includes one or more base station-antenna 120. The base station-antenna 120 is configured to transmit RF signals (e.g., BTR RF signals 150) to one or more of the relay platforms 110 (e.g., over the BTR link 112). Conversely, the base station-antenna 120 is configured to receive RF signals (e.g., RTB RF signals 174) from one or more of the relay platforms 110 (e.g., over the RTB link 118). In one example, the base station-antenna 120 includes a separate transmit antenna (e.g., one or more antenna elements configured to transmit) and receive antenna (e.g., one or more antenna elements configured to receive). In another example, the base station-antenna 120 includes a combined transmit/receive antenna (e.g., one or more antenna elements configured to transmit and receive).

In one embodiment, the base station 106 (e.g., the base station-RF equipment 164) includes a base station-transmitter 178 and a base station-receiver 180 coupled to the base station-antenna 120. While the example embodiment shown in FIG. 9 illustrates the base station-transmitter 178 and the base station-receiver 180 as separate elements, in other embodiments, the base station-transmitter 178 and the base station-receiver 180 are integrated as a single transceiver.

In one example, the base station-antenna 120 is configured to transmit a directional (e.g., a high gain) RF signal, for example, as an RF beam. For example, the base station-antenna 120 transmits the BTR RF signal 150 directed at the relay platform 110. As examples, the base station-antenna 120 may be one or more of horn antennas, analog phased arrays, digital phases arrays, a reflector antenna and the like.

In one embodiment, the RF equipment 162 includes a beamformer 184 (e.g., a beamformer module) to control a pointing direction of the BTR RF signal 150, for example, by electronically steering the RF beam. When transmitting the RF signal (e.g., BTR RF signal 150), the beamformer 184 is configured to control the phase and/or relative amplitude of the BTR RF signal 150. As one example, the beamformer 184 is part of the base station-RF equipment 164 (e.g., is implemented at the base station 106).

In another embodiment, the base station 106 includes a mechanical device (not explicitly illustrated) that physically moves the base station-antenna 120 to control a pointing direction of the BTR RF signal 150, for example, by mechanically steering the RF beam.

In one embodiment, the base station 106 (e.g., the base station-RF equipment 164) includes or is connected to a base station-controller 182 (e.g., a base station-controller module). The base station-controller 182 is configured to control the communication of RF signals and/or data to and/or from the relay platform 110 and/or a network 122. The base station-controller 182 may be remotely located with or co-located with (e.g., integral to) the base station 106.

The base stations 106 are ground-based base stations, also commonly referred to as a ground station, a gateway or a teleport. The base stations 106 may be geographically separated (e.g., spaced apart from one another). As general examples, the base station 106 may be one or more of audio, video and/or data service providers. As one specific example, base station 106 may be an Internet service provider. As other specific examples, the base station 106 may be a telephone, voice and/or data service provider. As yet other specific examples, the base station 106 may be a television, video and/or audio broadcaster.

In one embodiment, the base station 106 is coupled to or otherwise part of a terrestrial network 122. As one specific example, the network 122 includes a telecommunications network, such as the Internet. Thus, the base station 106 provides connectivity between the user terminal 108 and the network 122 through the relay platform 110.

Figure 10:
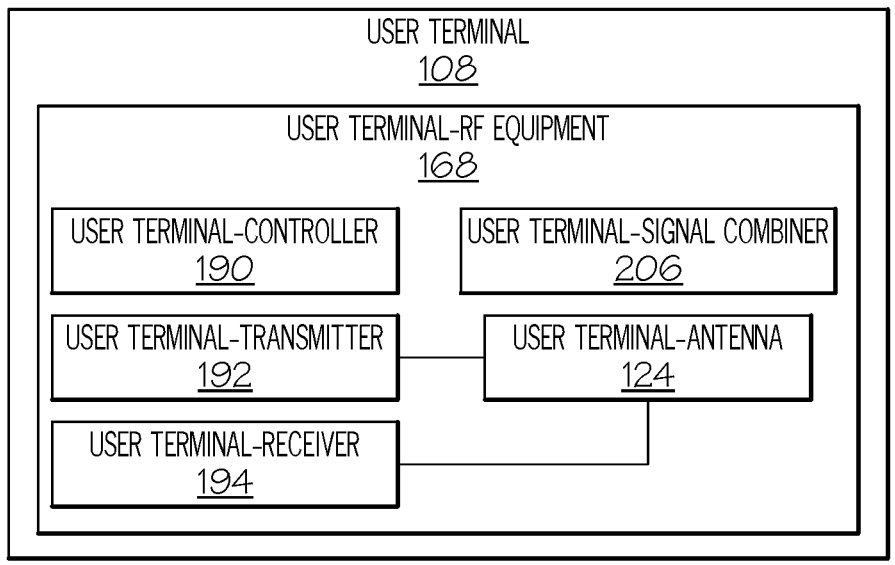
FIG. 10 is a schematic block diagram of one embodiment of a user terminal of the disclosed communications system.

Referring to FIG. 10, and with reference to FIG. 1, in one embodiment, the user terminal (e.g., the user terminal-RF equipment 168) includes one or more user terminal-antenna 124. The user terminal-antenna 124 is configured to transmit RF signals (e.g., UTR RF signals 170) to one or more of the relay platforms 110 (e.g., over the UTR link 116). Conversely, the user terminal-antenna 124 is configured to receive RF signals (e.g., RTU RF signals 158) from one or more of the relay platforms 110 (e.g., over the RTU link 114). In one example, the user terminal-antenna 124 includes a separate transmit antenna (e.g., one or more antenna elements configured to transmit) and receive antenna (e.g., one or more antenna elements configured to receive). In another example, the user terminal-antenna 124 includes a combined transmit/receive antenna (e.g., one or more antenna elements configured to transmit and receive).

In one embodiment, the user terminal 108 (e.g., the user terminal-RF equipment 168) includes a user terminal-transmitter 192 and a user terminal-receiver 194 coupled to the user terminal-antenna 124. While the example embodiment shown in FIG. 10 illustrates the user terminal-transmitter 192 and the user terminal-receiver 194 as separate elements, in other embodiments, the user terminal-transmitter 192 and the user terminal-receiver 194 are integrated as a single transceiver.

In one example, the user terminal-antenna 124 is configured to transmit an omni-directional RF signal. For example, the user terminal-antenna 124 transmits the UTR RF signal 170, which is received by the relay platform 110.

In one embodiment, the user terminal 108 (e.g., the user terminal-RF equipment 168) includes or is connected to a user terminal-controller 190 (e.g., a user terminal-controller module). The user terminal-controller 190 is configured to control the communication of RF signals and/or data to and/or from the relay platform 110. The user terminal-controller 190 may be co-located with (e.g., integral to) the user terminal 108.

The user terminals 108 may be any of a variety of different types, such as small-sized terminals (e.g., handheld terminals, mobile telephones, etc.), medium-sized terminals (e.g., portable terminals, vehicular terminals, etc.) and/or large-sized terminals (e.g., tower terminals, maritime terminals, etc.). As one example, the user terminal 108 includes any communications device used by an end user (e.g., an audio, video, or data communications device). Thus, an audio, video, and/or data service provider may service the user terminals 108.

Figure 11:
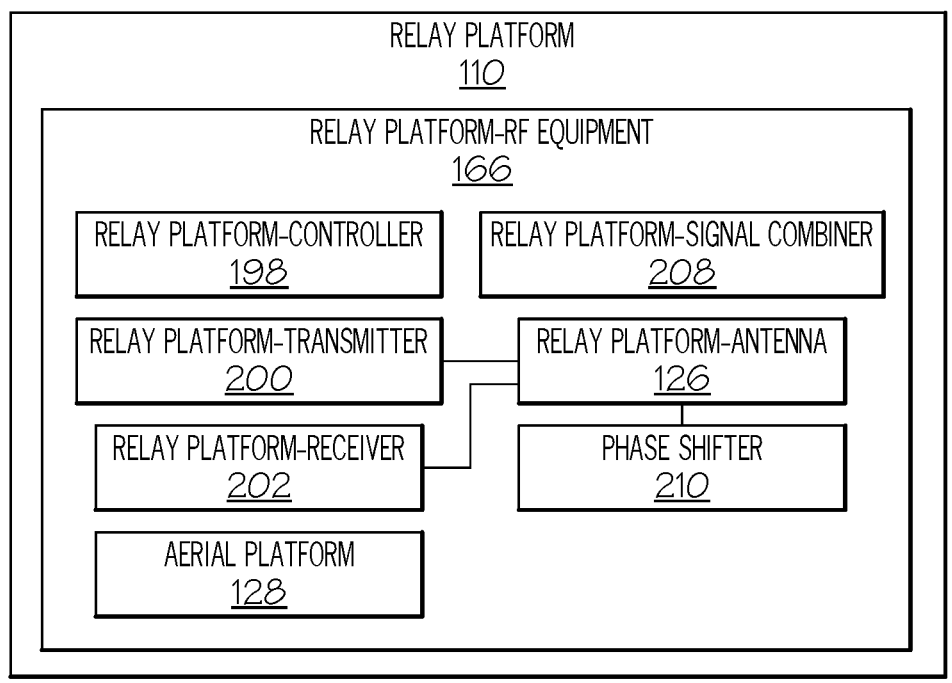
FIG. 11 is a schematic block diagram of one embodiment of a communications relay platform of the disclosed communications system.

Referring to FIG. 11, and with reference to FIG. 1, in one embodiment, the relay platform 110 (e.g., the relay platform-RF equipment 166) includes one or more relay platform-antenna 126. The relay platform-antenna 126 is configured to transmit RF signals (e.g., RTU RF signals 158) to one or more of the user terminals 108 (e.g., over the RTU link 114) and/or transmit RF signals (e.g., RTB RF signals 174) to one or more of the base stations 106 (e.g., over the RTB link 118). Conversely, the relay platform-antenna 126 is configured to receive RF signals (e.g., BTR RF signals 150) from one or more of the base stations 106 (e.g., over the BTR link 112) and receive RF signals (e.g., UTR RF signals 170) from one or more of the user terminals 108 (e.g., over the UTR link 116). In one example, the relay platform-antenna 126 includes a separate transmit antenna (e.g., one or more antenna elements configured to transmit) and receive antenna (e.g., one or more antenna elements configured to receive). In another example, the relay platform-antenna 126 includes a combined transmit/receive antenna (e.g., one or more antenna elements configured to transmit and receive).

In one embodiment, the relay platform 110 (e.g., the relay platform-RF equipment 166) includes a relay platform-transmitter 200 and a relay platform-receiver 202 coupled to the relay platform-antenna 126. While the example embodiment shown in FIG. 11 illustrates the relay platform-transmitter 200 and the relay platform-receiver 202 as separate elements, in other embodiments, the relay platform-transmitter 200 and the relay platform-receiver 202 are integrated as a single transceiver.

In one example, the relay platform-antenna 126 is configured to transmit a directional (e.g., a high gain) RF signal, for example, as an RF beam. As one example, the relay platform-antenna 126 transmits the RTU RF signal 158 directed at the user terminal 108. As another example, the relay platform-antenna 126 transmits the RTB RF signal 174 directed at the base station 106. As examples, the relay platform-antenna 126 may be one or more of analog phased arrays, digital phases arrays, a reflector antenna and the like.

For example, relay platform-antenna 126 may include a plurality of the antenna elements arranged in a linear array or a planar array.

In one embodiment, the RF equipment 162 includes the beamformer 184 (e.g., the beamformer module) to control a pointing direction of the RTU RF signal 158 and/or the RTB RF signal 174, for example, by electronically steering the RF beam. When transmitting the RF signal (e.g., RTU RF signal 158 and/or RTB RF signal 174), the beamformer 184 is configured to control the phase and/or relative amplitude of the RTU RF signal 158 and/or the RTB RF signal 174. As one example, the beamformer 184 is part of the base station-RF equipment 164 (e.g., is implemented at the base station 106). As one example, the beamformer 184 is part of the relay platform-RF equipment 166 (e.g., is implemented onboard the relay platform 110).

In one embodiment, the relay platform 110 (e.g., the relay platform-RF equipment 166) includes or is connected to a relay platform-controller 198 (e.g., a relay platform-controller module). The relay platform-controller 198 is configured to control the communication of RF signals and/or data to and/or from the base station 106 and/or the user terminal 108. The relay platform-controller 198 may be remotely located with or co-located onboard (e.g., integral to) the relay platform 110.

Referring to FIGS. 5 and 6, and with reference to FIG. 3, in an exemplary embodiment, the first BTR link 112$a$ includes a first BTR RF signal 150$a$ having a first BTR RF 152$a$ encoded with a first BTU data sub-stream 156$a$ (e.g., a first portion of the BTU data stream 154) (FIG. 3). The second BTR link 112$b$ includes a second BTR RF signal 150$b$ having a second BTR frequency 152$b$ encoded with a second BTU data sub-stream 156$b$ (e.g., a second portion of the BTU data stream 154). The first RTU link 114$a$ includes a first RTU RF signal 158$a$ having a first RTU frequency 160$a$ encoded with the first BTU data sub-stream 156$a$. The second RTU link 114$b$ includes a second RTU RF signal 158$b$ having a second RTU frequency 160$b$ encoded with the second BTU data sub-stream 156$b$.

In one example, the BTU data sub-stream 156 carried by each one of the BTR links 112 and the RTU links 114 is different. For example, the first BTU data sub-stream 156$a$ and the second BTU data sub-stream 156$b$ represent different data or symbols of the complete BTU data stream 154.

While the example embodiments shown in FIGS. 5 and 6 illustrate only two BTR links 112 and two RTU links 114 carrying two BTU data sub-streams 156, in other embodiments, the BTU data stream 154 may be divided into more than two portions. As such, in other embodiments, additional BTR links 112 and RTU links 114 carrying additional BTU data sub-stream 156 may be used.

Similarly, while the example embodiments shown in FIGS. 5 and 6 illustrate only two BTR links 112 and two RTU links 114 being relayed through two relay platforms 110, in other embodiments additional BTR links 112 and RTU links 114 may be used, which are relayed through additional relay platforms 110. Generally, the number of relay platforms 110 will be equal to or greater than the number of different BTR links 112 and/or RTU links 114.

In one example, the BTR frequency 152 of the BTR RF signal 150 of at least one (e.g., each one) of the BTR links 112 is the different. For example, the first BTR frequency 152$a$ and the second BTR frequency 152$b$ are different. As examples, the BTR frequency 152 includes the C-band (e.g., approximately 6 GHz), the Ku-band (e.g., approximately 30 GHz), the V-band (e.g., approximately 50 GHz), the W-band (e.g., approximately 80 GHz) and the optical band. Using different BTR frequencies 152 avoids or prevents interference between different ones of the BTR RF signals 150 (e.g., provides interference free connections between the base stations 106 and the relay platforms 110) and, in effect, increases capacity by frequency multiplexing.

Similarly, in one example, the RTU frequency 160 of the RTU RF signal 158 of at least one (e.g., each one) of the RTU links 114 is the different. For example, the first RTU frequency 160a and the second RTU frequency 160b are different. As examples, the RTU frequency 160 includes the L-band (e.g., approximately 1.5 GHz), the C-band (e.g., approximately 4 GHz), the Ku-band (e.g., approximately 10 GHz), the Ka-band (e.g., approximately 20 GHz) and the V-band (e.g., approximately 40 GHz). Using different RTU frequencies 160 avoids or prevents interference between different ones of the RTU RF signals 158 (e.g., provides interference free connections between the relay stations 110 and the user terminal 108) and, in effect, increases capacity by frequency multiplexing.

In another example, the BTR frequency 152 of the BTR RF signal 150 of at least one (e.g., each one) of the BTR links 112 is the same. For example, the first BTR frequency 152a and the second BTR frequency 152b are the same. As examples, the BTR frequency 152 includes the C-band (e.g., approximately 6 GHz), the Ku-band (e.g., approximately 30 GHz), the V-band (e.g., approximately 50 GHz), the W-band (e.g., approximately 80 GHz) and the optical band. In order to avoid or prevent frequency interference between the base stations 106 and the relay platforms 110, other types of multiplexing may be used. Examples of different multiplexing approaches include time multiplexing, polarization multiplexing, spatial multiplexing, phase multiplexing or the like. For example, the BTR RF signal 150 of different BTR links 112 can be at the same BTR frequency 152 but can use a different frequency-division multiplexing (FDM) channel or a different polarization. Alternatively, when two relay platforms 110 are separated by a sufficiently large distance, the same channel can be used.

Similarly, in another example, the RTU frequency 160 of the RTU RF signal 158 of at least one (e.g., each one) of the RTU links 114 is the same. For example, the first RTU frequency 160a and the second RTU frequency 160b are the same. As examples, the RTU frequency 160 includes the L-band (e.g., approximately 1.5 GHz), the C-band (e.g., approximately 4 GHz), the Ku-band (e.g., approximately 10 GHz), the Ka-band (e.g., approximately 20 GHz) and the V-band (e.g., approximately 40 GHz). In order to avoid or prevent frequency interference between the relay stations 110 and the user terminals 108, other types of multiplexing may be used. Examples of different multiplexing approaches include time multiplexing, polarization multiplexing, spatial multiplexing, phase multiplexing or the like. For example, the RTU RF signal 158 of different RTU links 114 can be at the same RTU frequency 160 but can use a FDM channel or a different polarization. Alternatively, when two relay platforms 110 are separated by a sufficiently large distance, the same channel can be used.

Referring to FIGS. 7 and 8, and with reference to FIG. 4, in an exemplary embodiment, the first UTR link 116a includes a first UTR RF signal 170a having a first UTR frequency 172a encoded with a first UTB data stream 196a. The second UTR link 116b includes a second UTR RF signal 170b having a second UTR frequency 172b encoded with a second UTB data stream 196b. The first RTB link 118a includes a first RTB RF signal 174a having a first RTB frequency 176a encoded with the first UTB data stream 196a. The second RTB link 118b includes a second RTB RF signal 174b having a second RTB frequency 176b encoded with the second UTB data stream 196b.

In one example, each of the UTB data streams 196 carried by each one of the UTR links 116 and the RTB links 118 is different. For example, the first UTB data stream 196a represents data or symbols of one UTB data stream 196 transmitted from the first user terminal 108a and the second UTB data stream 196b represents data or symbols of another UTB data stream 196 transmitted from the second user terminal 108b.

While the example embodiments shown in FIGS. 7 and 8 illustrate only two UTR links 116 and two RTB links 118 carrying two UTB data streams 196, in other embodiments, additional UTB data stream 196 may be included. As such, in other embodiments, additional UTR links 116 and RTB links 118 carrying additional UTB data streams 196 may be used.

Similarly, while the example embodiments shown in FIGS. 7 and 8 illustrate only two UTR links 116 and two RTB links 118 being relayed through two relay platforms 110, in other embodiments additional UTR links 116 and RTB links 118 may be used, which are relayed through additional relay platforms 110. Generally, the number of relay platforms 110 will be equal to or greater than the number of different UTR links 116 and/or RTB links 118.

In one example, the UTR frequency 172 of the UTR RF signal 170 of at least one (e.g., each one) of the UTR links 116 is the different. For example, the first UTR frequency 172a and the second UTR frequency 172b are different. As examples, the UTR frequency 172 includes the L-band (e.g., approximately 1.6 GHz), the S-band (e.g., approximately 2.6 GHz), the C-band (e.g., approximately 6 GHz), the Ku-band (e.g., approximately 12 GHz), the Ka-band (e.g., approximately 30 GHz) and the V-band (e.g., approximately 50 GHz). Using different UTR frequencies 172 avoids or prevents interference between different ones of the UTR RF signals 170 (e.g., provides interference free connections between the user terminals 108 and the relay platforms 110) and, in effect, increases capacity by frequency multiplexing.

Similarly, in one example, the RTB frequency 176 of the RTB RF signal 174 of at least one (e.g., each one) of the RTB links 118 is the different. For example, the first RTB frequency 176a and the second RTB frequency 176b are different. As examples, the RTB frequency 176 includes the C-band (e.g., approximately 4 GHz), the Ku-band (e.g., approximately 10 GHz), the Ka-band (e.g., approximately 20 GHz), the V-band (e.g., approximately 40 GHz), the W-band (e.g., approximately 70 GHz) and the optical band. Using different RTB frequencies 176 avoids or prevents interference between different ones of the RTB RF signals 174 (e.g., provides interference free connections between the relay stations 110 and the base station 106) and, in effect, increases capacity by frequency multiplexing.

In another example, the UTR frequency 172 of the UTR RF signal 170 of at least one (e.g., each one) of the UTR links 116 is the same. For example, the first UTR frequency 172a and the second UTR frequency 172b are the same. As examples, the UTR frequency 172 includes the L-band (e.g., approximately 1.6 GHz), the S-band (e.g., approximately 2.6 GHz), the C-band (e.g., approximately 6 GHz), the Ku-band (e.g., approximately 12 GHz), the Ka-band (e.g., approximately 30 GHz) and the V-band (e.g., approximately 50 GHz). In order to avoid or prevent frequency interference between the user terminals 108 and the relay platforms 110, other types of multiplexing may be used. Examples of different multiplexing approaches include time multiplexing, polarization multiplexing, spatial multiplexing, phase multiplexing or the like.

Similarly, in another example, the RTB frequency 176 of the RTB RF signal 174 of at least one (e.g., each one) of the RTB links 118 is the same. For example, the first RTB frequency 176a and the second RTB frequency 176b are the same. As examples, the RTB frequency 176 includes the C-band (e.g., approximately 4 GHz), the Ku-band (e.g., approximately 10 GHz), the Ka-band (e.g., approximately 20 GHz), the V-band (e.g., approximately 40 GHz), the W-band (e.g., approximately 70 GHz) and the optical band. In order to avoid or prevent frequency interference between the relay stations 110 and the base stations 106, other types of multiplexing may be used. Examples of different multiplexing approaches include time multiplexing, polarization multiplexing, spatial multiplexing, phase multiplexing or the like.

Referring to FIG. 9, and with reference to FIGS. 5-9, in one embodiment, the base station 106 (e.g., the base station-RF equipment 164) includes a base station-signal combiner 204 (e.g., a base station-signal combiner module). The base station-signal combiner 204 is configured to process and combine the different RF signals (e.g., RTB RF signals 174) received by the base station 106 from the relay platform 110. The base station-signal combiner 204 aligns the multiple RTB RF signals 174 and performs a weighted combining operation. In one example, combining different RF signals (e.g., different RTB RF signals 174), for example, implemented by the base station-signal combiner 204, can occur at different layers. As one example, at an RF layer, the transmitted signals are amplitude and phase adjusted such that at the receiver end, the phase of the received signals are aligned, and coherently combined with appropriate amplitude weights according to an estimated signal-to-noise ratio. As another example, the combining occurs at the symbol level (e.g., the physical layer) before soft symbol detection. The symbols are combined with the weights according to the signal-to-noise estimates of the two symbol streams. As yet another example, the combining is at the media access control (MAC) layer, where simply two received data streams are combined.

Referring to FIG. 11, and with reference to FIGS. 5-9, in one embodiment, the relay platform 110 (e.g., the relay platform-RF equipment 166) includes a relay platform-signal combiner 208 (e.g., a relay platform-signal combiner module). The relay platform-signal combiner 208 is configured to process and combine the different RF signals (e.g., BTR RF signals 150) received by the relay platform 110 from one or more base stations 106 and/or the different RF signals (e.g., UTR RF signals 170) received by the relay platform 110 from one or more user terminals 108. The relay platform-signal combiner 208 aligns the multiple BTR RF signals 150 and/or UTR RF signals 170 and performs a weighted combining operation. As one example, the relay platform 110 receives the signals from two different base stations 106 using the same frequency band and channels given that a sufficient distance separates the two base stations 106. The received signals are then routed to appropriate beam or beams.

Referring to FIG. 2, in one embodiment, the RF equipment 162 of the communications system 100 includes a signal coordinator 186 (e.g., a signal coordinator module). The signal coordinate 186 is configured to identify (e.g., determine) and process the phase and/or amplitude of each of the plurality of RF signals (e.g., RTU RF signals 158) transmitted by relay platform 110 directed to the user terminal 108. The signal coordinator 186 is configured to pre-compensate for time delay, phase alignment, spatial positioning and the like of the transmitted RF signals (e.g., RTU RF signals 158) such that the RF signals (e.g., RTU RF signals 158) will be properly aligned and combined when they reach the user terminal 108. Thus, the operations performed by the signal coordinator 186 reduce the signal processing complexity of the user terminal-RF equipment 168. As one example, the signal coordinator 186 may form part of the base station-RF equipment 164 (e.g., be implemented on the ground by one or more of the base stations 106). As another example, the signal coordinate 186 may form part of the relay platform-RF equipment 166 (e.g., be implemented onboard the relay platform 110).

Referring to FIG. 10, in another embodiment, for example, where the RF equipment 162 does not include the signal coordinator 186 (e.g., the communications system 100 does not pre-compensate for the RTU RF signals 158), the user terminal 108 (e.g., the user terminal-RF equipment 168) includes a user terminal-signal combiner 206 (e.g., a user terminal-signal combiner module). The user terminal-signal combiner 206 is configured to process and combine the different RF signals (e.g., RTU RF signals 158) received by the user terminal 108 from the relay platforms 110. The user terminal-signal combiner 206 aligns the multiple RTU RF signals 158 and performs a weighted combining operation. As one example, combining different RF signals (e.g., different RTU RF signals 158), for example, implemented by the user terminal-signal combiner 206, can occur at different layers. As one example, at an RF layer, the transmitted signals are amplitude and phase adjusted such that at the receiver end, the phase of the received signals are aligned, and coherently combined with appropriate amplitude weights according to an estimated signal-to-noise ratio. As another example, the combining occurs at the symbol level (e.g., the physical layer) before soft symbol detection. The symbols are combined with the weights according to the signal-to-noise estimates of the two symbol streams. As yet another example, the combining is at the media access control (MAC) layer, where simply two received data streams are combined.

Referring to FIG. 1, in an exemplary embodiment, the communications system 100 includes a plurality of the base stations 106, a plurality of the user terminals 108 and a plurality of the relay platforms 110. Although three relay platforms 110, two base stations 106 and three user terminals 108 are shown in the example illustrated in FIG. 1, in other examples, the communications system 100 may include fewer or more of each.

Figure 12:
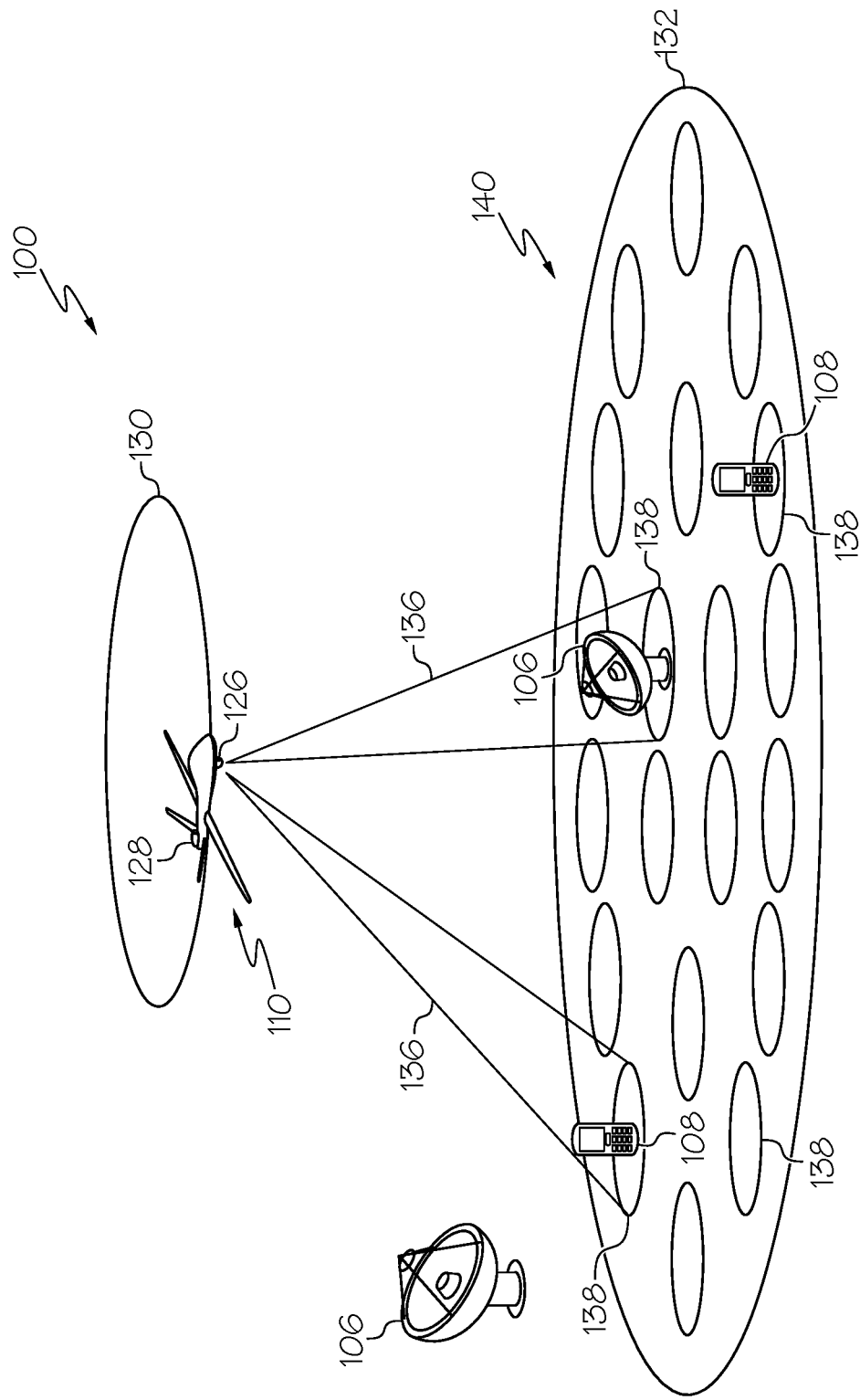
FIG. 12 is a schematic illustration of another embodiment of the disclosed communications system depicting a coverage area.

Referring to FIG. 12, and with reference to FIGS. 1 and 11, each one of the relay platforms 110 operates as a high altitude communications relay or node between one or more of the base stations 106 and one or more of the user terminals 108. In one embodiment, the relay platform 110 includes an aerial platform 128 that carries the relay platform-antenna 126 and other components of the relay platform-RF equipment 166 (e.g., an RF payload).

As one example, the aerial platform 128 (e.g., the relay platform 110) is an unmanned aerial vehicle ("UAV"). The aerial platform 128 flies along a predetermined flight path 130 over a given geographic area on Earth. An unmanned aerial platform 128 is an unpiloted aircraft that is either controlled remotely or is flown autonomously along a pre-programmed flight path. The aerial platform 128 may be capable of flying for long periods of time (e.g., from several months to a year or more) at an operating altitude. As one specific example, the aerial platform 128 is a solar-powered electric UAV.

The aerial platform 128 (e.g., each relay platform 110) operates within a minimum altitude (e.g., approximately 12 km) and a maximum altitude (e.g., approximately 55 km). As one example, the aerial platform 128 operates from a high, suborbital altitude (e.g., in the stratosphere). As one specific example, the aerial platform 128 operates at an altitude of approximately 20 km.

Referring to FIG. 12, in one embodiment, the relay platform 110 (e.g., the aerial platform 128) is assigned to fly within the flight path 130. As one example, the flight path 130 is a circular or nearly circular path (as illustrated in FIG. 12). As another example, the flight path 130 is an elliptical path. As another example, the flight path 130 is a series of two intersecting or adjoining nearly circular or elliptical paths (e.g., a FIG. 8). As yet another example, the flight path 130 is series of more than two intersecting or adjoining nearly circular or elliptical paths. As one example, the flight path 130 may be maintained having a major dimension (e.g., a diameter) of between approximately 1 km and 5 km.

The relay platform 110 covers (e.g., provides communications coverage over) a coverage area 132. The relay platform 110 is assigned to fly within the flight path 130 over the coverage area 132. The coverage area 132 may be a geographic region, a metropolitan area, a market area and the like. As one example, the coverage area 132 may include a major dimension (e.g., a diameter) of approximately 40 km. The ground-based user terminals 108 are located within the coverage area 132. The ground-based base stations 106 may be located within or outside of the coverage area 132.

In various embodiments of the communications system 100, the base stations 106 and the relay platforms 110 enable communication between the user terminals 108 and the network 122 (FIG. 1). In this regard, as one example, the base station 106 receives information (e.g., data) from the network 122, and wirelessly communicates the information to the relay platform 110. The relay platform 110 in turn wirelessly transmits or relays the information to one or more of the user terminals 108. Conversely, the relay platform 110 receives information from one or more of the user terminals 108, and in turn wirelessly communicates the information to the base station 106, which in turn transmits or relays the information to the network 122.

In one embodiment, each of the relay platforms 110 employs a plurality of RF beams 136 or RF spot beams 136 (also referred to individually as an RF beam 136 or an RF spot beam 136). As one example, the beamformer 184 shapes the RTU RF signal 158 (carrying the BTU data sub-stream 156) to form the RF beam 136 (also referred to as a relay-to-user (RTU) RF beam). Each RF beam 136 has a transmission direction pointing towards the ground and covers a service area 138 (also referred to as a ground cell).

As one example, each one of the service areas 138 represent a footprint of the shaped RTU RF signal 158 (FIG. 3) (i.e., the RF beam 136). The RF beam 136 may also referred to as a spot beam, which is radiated from the relay platform 110 to Earth's surface. In other words, the area covered by the RF beam 136 defines the service area 138. The plurality of RF beams 136 divides the coverage area 132 into a plurality of the service areas 138 (only two of the plurality of RF beams 136 and three of the plurality of service areas 138 are explicitly identified in FIG. 12). Thus, each RTU link 114 (FIG. 1) is produced by one of the RF beams 136. The ground-based user terminals 108 located within the same service area 138 are served by the same RF beam 136.

As described above, in one embodiment, the RF beams 136 may operate at the same or different frequencies. In one embodiment, the operating frequencies of the RF beams 136 (e.g., the RTU frequencies 160 of the RTU RF signals 158) directed at neighboring (e.g., directly adjacent) service areas 138 are different to prevent frequency interference. Different operating frequencies within neighboring service areas 138 also allow some overlap between the neighboring service areas 138 (overlap of adjacent or neighboring RF beams 136).

Thus, the coverage area 132 may be segmented into the plurality of service areas 138 defined by the plurality of RF beams 136 to produce a frequency reuse ground pattern 140, so that the same RF frequencies or channels may be reused within different service areas 138. That is, the relay platform 110 may reuse the same frequency in different RF beams 136.

Referring to FIG. 11, and with reference to FIG. 12, in one embodiment, each of the relay platforms 110 (e.g., the relay platform-RF equipment 166) includes at least one phase shifter 210 (e.g., a phase shifter module). The phase shifter 210 is operably coupled to the relay platform-antenna 126 to electronically steer the RF beam 136 in order to control the pointing direction of the RF beam 136.

Figure 13:
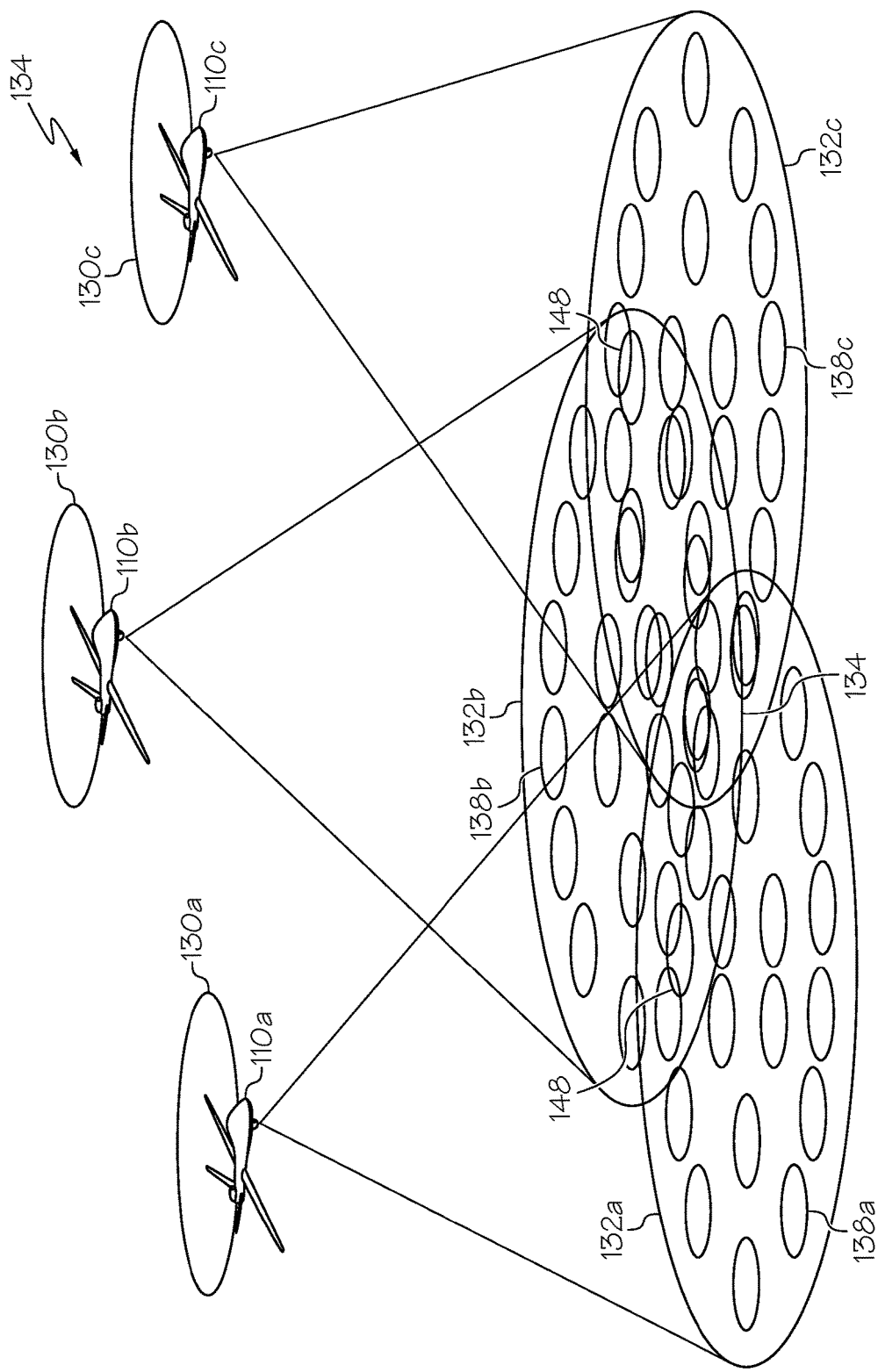
FIG. 13 is a schematic illustration of another embodiment of the disclosed communications system depicting a common coverage area.

Referring to FIG. 13, and with reference to FIGS. 1 and 12, in one embodiment, a collection 146 (e.g., a group) of two or more of the relay platforms 110 (three relay platforms 110 are illustrated as the collection 146 in FIG. 13) provides coverage to a plurality of coverage areas 132. As one example, the first relay platform 110a (travelling along a first flight path 130a) provides coverage to a first coverage area 132a. The second relay platform 110b (travelling along a second flight path 130b) provides coverage to a second coverage area 132b. A third relay platform 110c (travelling along a third flight path 130c) provides coverage to a third coverage area 132c. While only three relay platforms 110 and three associated coverage areas 132 are shown by example in FIG. 13, in other examples, the collection 146 may include any number of relay platforms 110 and associated coverage areas 132.

Each one of the relay platforms 110 includes its own associated flight path 130, for example, positioning the relay platform 110 directly over a predetermined position to service the associated coverage area 132. In one example, the relay platforms 110 forming the collection 146 are geographically separated, for example, depending upon the overall size of the associated coverage area 132. The relay platforms 110 forming the collection 146 may operate at the same altitude or different altitudes.

Each of the relay platforms 110 directs a plurality of the RF beams 136 (FIG. 12) dividing the associated coverage area 132 into the plurality of service areas 138. As one example, the first coverage area 132a is divided into a plurality of first service areas 138a (only one of the first service areas is explicitly identified). The second coverage area 132b is divided into a plurality of second service areas 138b (only one of the second service areas is explicitly identified). The third coverage area 132c is divided into a plurality of third service areas 138c (only one of the third service areas is explicitly identified).

In one embodiment, at least portions of two or more of the coverage areas 132 overlap to cover the same area and form one or more combined coverage areas 134. As one example, overlapping portions of the first coverage area 132a, the second coverage area 132b and the third coverage area 132c form the common coverage area 134, as identified in FIG. 13. Other combined coverage areas (not explicitly identified) are also formed, for example, by overlapping portions of the first coverage area 132a and the second coverage area 132b, overlapping portions of the first coverage area 132a and the third coverage area 132c, etc.

Figure 14:
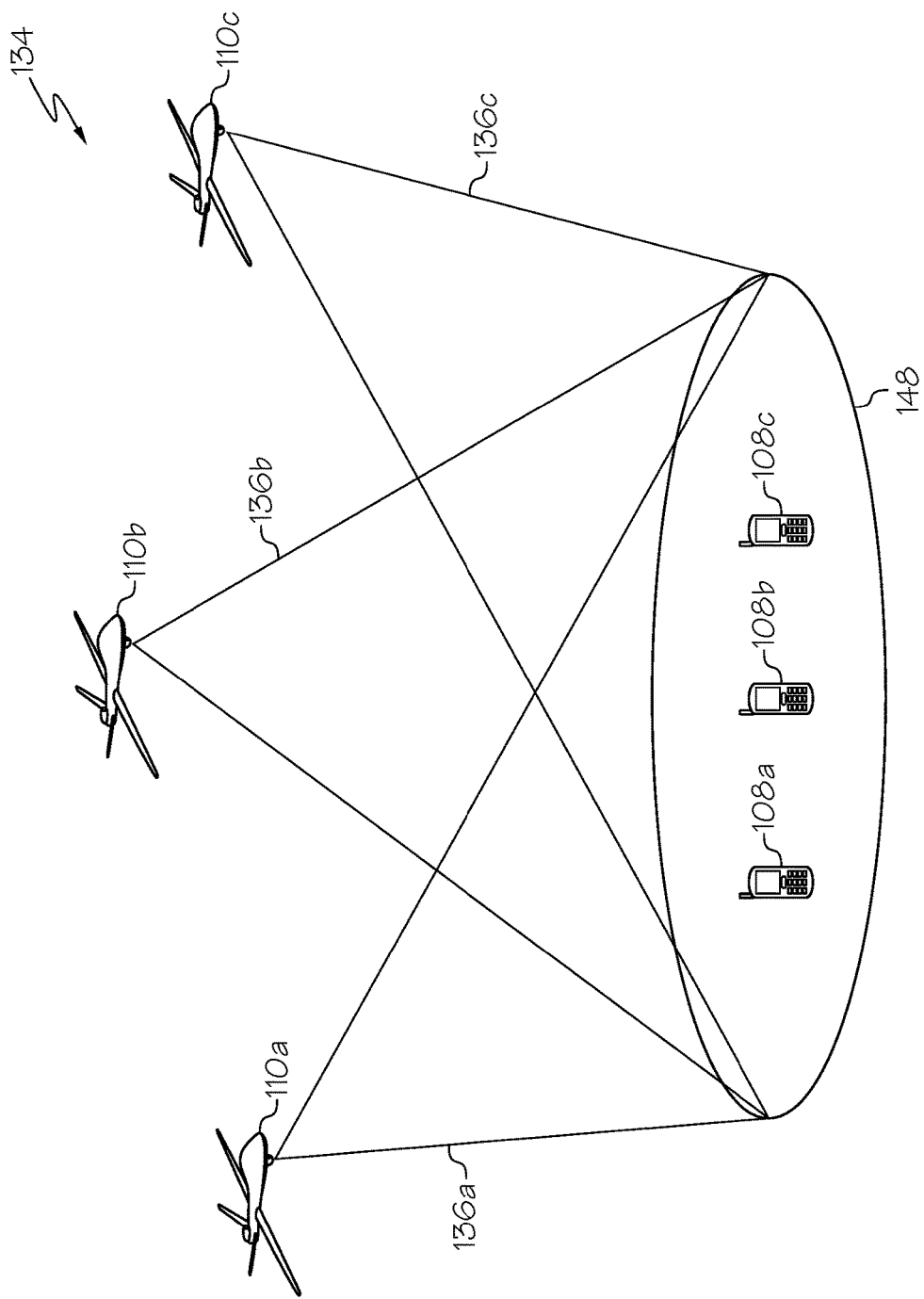
FIG. 14 is a schematic illustration of another embodiment of the disclosed communications system depicting a common service area.

Referring to FIG. 14, and with reference to FIGS. 12 and 13, in one embodiment, at least portions of two or more of the service areas 138 from overlapping coverage areas 132 overlap to cover the same area and form a combined service area 148. As illustrated in FIG. 13, the common coverage area 134 may include one or more common service areas 148. Thus, each of the relay platforms 110 of the collection 146 transmits an associated RF beam 136 directed to (e.g., projected onto) the common service area 148.

Referring to FIG. 14, and with reference to FIGS. 3, 5 and 6, in an exemplary embodiment, the RF beams 136 produced by the relay platforms 110 and directed to the common service area 148 operate at different frequencies, channels or RF bands to avoid interference. As one example, a first RF beam 136a transmitted by the first relay platform 110a has a first operating frequency or band and is encoded with a first portion of the BTU data stream 154 (e.g., is formed by the first RTU RF signal 158a having the first RTU frequency 160a encoded with the first BTU data sub-stream 156a). A second RF beam 136b transmitted by the second relay platform 110 has a second operating frequency or band, different from the first operating frequency of the first RF beam 136a, and is encoded with a second portion of the BTU data stream 154 (e.g., is formed by the second RTU RF signal 158b having the second RTU frequency 160b encoded with the second BTU data sub-stream 156b). As illustrated by example, additional RF beams (e.g., a third RF beam 136 having a third operating frequency, different from the first and the second operating frequencies, and encoded with a third portion of the BTU data stream) may be transmitted by additional relay platforms 110 (e.g., the third relay platform 110c). Each one of the plurality of user terminals 108 (e.g., the first user terminal 108a, the second user terminal 108b and the third user terminal 108c) is capable of wirelessly communicating (e.g., receiving an associated BTU data sub-stream 156) from two or more of the plurality of relay platforms 110. Generally, the number of RTU RF signals 158 that a given user terminal 108 is capable of receiving from an associated number of relay platforms 110 depends on the number of user terminal-antennas 124 (e.g., the number of receive antennas 224 of the MIMO-OFDM receiver 216).

Thus, the multiple RF beams 136, servicing the common service area 148, effectively increase the capacity and data transmit speed in the common service area 148, for example, by using a predetermined multiplexing approach. As one example, time multiplexing may be achieved by allotting special time frames in the RTU RF signal 158 transmitted by each of the relay platforms 110. As another example, polarization multiplexing may be achieved by configuring the relay platform-antenna 126 to receive and transmit polarized RF radiation in orthogonally polarized (e.g., non-interfering) states. As another example, spatial and positional multiplexing may be achieved by using multiple-input multiple-output approaches to increase the frequency capacity.

Figure 15:
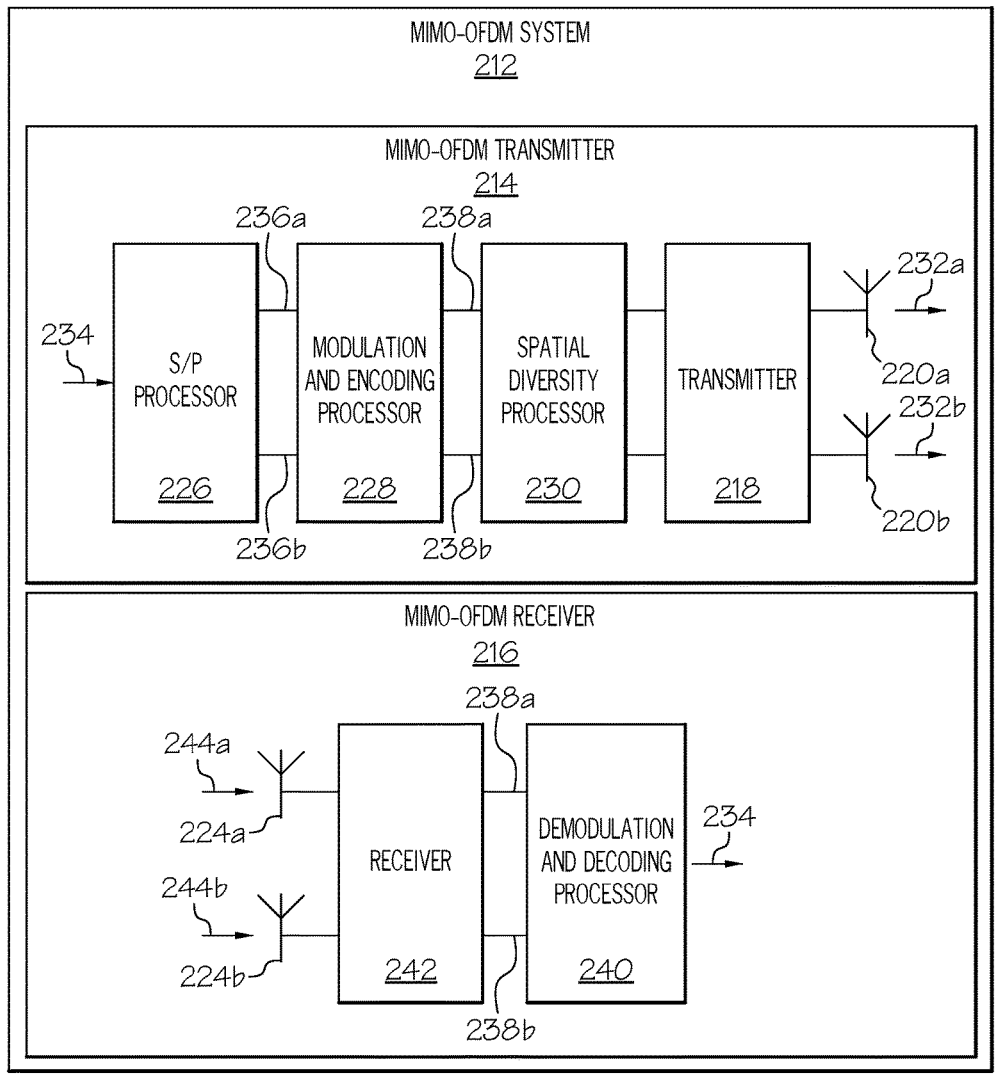
FIG. 15 is a schematic block diagram of one embodiment of a MIMO-OFDM system.

Referring to FIG. 15, and with reference to FIGS. 2 and 3, in an exemplary embodiment, the communications system 100 is configured to transmit the BTU data stream 154 as multiple BTU data sub-streams 156 using multiple antennas in a multiple-input multiple-output (MIMO) system with an orthogonal frequency division multiplexing (OFDM) system. In other words, in one example, the RF equipment 162 includes a MIMO-OFDM system 212.

OFDM refers to a data transmission scheme where data (e.g., the BTU data stream 154) is split into a plurality of smaller streams (e.g., the BTU data sub-streams 156) and each stream is transmitted using a sub-carrier (e.g., the BTR RF signal 150) having a smaller bandwidth than the total available transmission bandwidth. The efficiency of OFDM depends on choosing the sub-carriers that are orthogonal to each other. In other words, the multiple BTR RF signals 150 transmitted by the base station 106 do not interfere with each other and each one carries a portion of the total BTU data stream 154.

MIMO refers to a wireless transmission and reception scheme where both a transmitter and a receiver employ more than one antenna. The MIMO system takes advantage of the spatial diversity or spatial multiplexing.

In one embodiment, the MIMO-OFDM system 212 includes a MIMO-OFDM transmitter 214 and a MIMO-OFDM receiver 216. In one example, the MIMO-OFDM transmitter 214 includes a serial to parallel (S/P) processor 226 (e.g., S/P processor module), one or more modulation and encoding processors 228 (e.g., modulation and encoding module), one or more spatial diversity processors 230 (e.g., spatial diversity processor module), one or more transmitters 218 (e.g., transmitter module) and two or more RF transmit antenna 220a, 220b.

A data stream 234 is received by the MIMO-OFDM transmitter 214 and is split into a plurality of (e.g., two) data sub-streams 236a, 236b (e.g., parallel transmission streams) by the S/P processor 226. The data sub-streams 236a, 236b are sent to the modulating and encoding processor 228 wherein a modulation scheme and coding rate are selected for each data sub-stream 236a, 236b and each of a plurality of (e.g., two) RF carrier signals 238a, 238b is modulated and encoded with an associated one of the data sub-streams 236a, 236b. Once encoded with the data sub-streams 236a, 236b, the spatial diversity processor 230 maps each of the RF carrier signals 238a, 238b to an orthogonal spatial position. The RF carrier signals 238a, 238b are sent to the transmitter 218, wherein a plurality of (e.g., two) RF transmit signals 232a, 232b are transmitted by the plurality of (e.g., two) transmit antenna 220a, 220b.

In one embodiment, the MIMO-OFDM receiver 216 includes one or more demodulation and decoding processors 240 (e.g., demodulation and decoding processor module), one or more receivers 242 (e.g., receiver module) and two or more RF receive antenna 224a, 224b.

The plurality of (e.g., two) RF transmit signals 232a, 232b are received by the plurality of (e.g., two) RF receive antenna 224a, 224b, as a plurality of (e.g., two) RF receive signals 244a, 244b. The receiver 242 sends the RF carrier signals 238a, 238b to the demodulating and decoding processor 240, wherein the data sub-streams 236a, 236b are decoded from the RF carrier signals 238a, 238b to form the data stream 234.

One advantage of OFDM is that the generation of orthogonal RF carrier signals at the MIMO-OFDM transmitter 214 and MIMO-OFDM receiver 216 can be done by using inverse fast Fourier transform (IFFT) and fast Fourier transform (FFT) engines. Since the IFFT and FFT implementations are well known, OFDM can be implemented easily and does not require complicated receivers.

Referring to FIG. 15, and with reference to FIG. 2, in one example, the MIMO-OFDM system 212 is distributed among the base station 106 (e.g., the base station-RF equipment 164), the relay platforms 110 (e.g., the relay platform-RF equipment 166) and the user terminals 108 (e.g., the user terminal-RF equipment 168).

Referring to FIG. 9, and with reference to FIGS. 2, 5, 6 and 15, in one embodiment, the base station-transmitter 178 includes the MIMO-OFDM transmitter 214 and the base station-antenna 120 includes the plurality of RF transmit antenna 220*a*, 220*b*. As such, the BTU data stream 154 is the data stream 234, the BTU data sub-streams 156 are the data sub-streams 236*a*, 236*b* and the BTR RF signals 150 are the RF transmit signals 232*a*, 232*b*.

Referring to FIG. 10, and with reference to FIGS. 2, 5, 6, and 15, in one embodiment, the user terminal-receiver 194 includes the MIMO-OFDM receiver 216 and the user terminal-antenna 124 includes the plurality of RF receive antenna 224*a*, 224*b*. As such, the BTU data stream 154 is the data stream 234, the BTU data sub-streams 156 are the data sub-streams 236*a*, 236*b* and the RTU RF signals 158 are the RF receive signals 244*a*, 244*b*.

Referring to FIG. 11, and with reference to FIGS. 2, 5, 6 and 15, in one embodiment, the relay platform-receiver 202 includes the MIMO-OFDM receiver 216, the relay platform-transmitter 200 includes the MIMO-OFDM transmitter 214 and the relay platform-antenna 126 includes the plurality of RF receive antenna 224*a*, 224*b* and the plurality of RF transmit antenna 220*a*, 220*b*. As such, the BTU data stream 154 is the data stream 234, the BTU data sub-streams 156 are the data sub-streams 236*a*, 236*b*, the BTR RF signals 150 are the RF receive signals 244*a*, 244*b* and the RTU RF signals 158 are the RF transmit signals 232*aa*, 223*b*.

Accordingly, the disclosed communications system 100 increases the capacity and speed of data transfer, particularly, from the base station 106 to the user terminal 108. The use of the plurality of relay platforms 110 to service the common service area 148 enables the capacity of each relay platform 110 to be combined, thus increasing the capacity at each one of the user terminals 108 located within the common service area 148.

Further, the use of the plurality of relay platforms 110 allows each one of the relay platforms 110 to distribute the RF load among the relay platforms 110. As such, each of the relay platforms 110 may carry a smaller RF payload, which requires less power and allows the aerial platform 128 to remain in flight for longer periods of time.

Additionally, using multiple relay platforms 110 allows for a better distribution of capacity to match spatially dependent loads. As one example, the relay platforms 110 may service different common service areas 148 at different time depending on the capacity needed at a given service area 138. For example, two or more of the relay platforms 110 may service one of the service areas 138, forming one common service area 148 (e.g., one geographic region, such as a downtown area of a city) during the day, when demand is high. During the evenings or on weekends, one or more of the relay platforms 110 may switch to service another one of the service areas 138, forming another common service area 148 (e.g., a different geographic region, such as the suburbs), when demand is high. As such, unused capacity from one relay platform 110 may be used to supplement another relay platform 110 (e.g., each relay platform 110 may serve a primary service area and one or more secondary service areas). Such a configuration counters the peak to trough utilization penalty that a single relay platform with a large RF payload servicing a dedicated service area would suffer.

Moreover, using multiple relay platforms 110 provides diversity and increased availability by distributing the communications network.

Another advantage of the disclosed communication system 100 is that smaller relay platforms 110 (as compared to large relay platforms 110 having larger RF equipment capable of more power and capacity) are easier and less expensive to manufacture. Smaller antenna apertures on single relay platform 110 will have a larger scan angle, thus covering a larger area. Further, the combination of multiple relay platforms 110 forms a larger effective aperture for higher system throughput, and higher data rates to individual users. The distributed relay platforms 110 can form much smaller beams, which increase the system capacity density (e.g., throughput/km$^2$).

Figure 16:
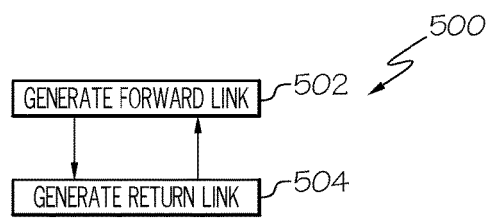
FIG. 16 is a flow diagram of one embodiment of the disclosed method for distributing wireless communications.

Referring to FIG. 16, and with reference to FIGS. 1-15, one embodiment of a method 500 for providing a distributed communications network is disclosed. The method 500 is one example implementation of utilizing the disclosed communications system 100.

Referring to FIG. 16, and with reference to FIGS. 3, 5 and 6, as shown at block 502, the method 500 includes the step of generating the forward link 102 configured for wireless transmission of the BTU data stream 154 from the base station 106 to the plurality of relay platforms 110, and from the plurality of relay platforms 110 to the user terminal 108.

Referring to FIG. 16, and with reference to FIGS. 4, 7 and 8, as shown at block 504, the method 500 includes the step of generating the return link 104 configured for wireless transmission of the UTB data stream 196 from the user terminal 108 to the relay platform 110, and from the relay platform 110 to the base station 106.

Figure 17:
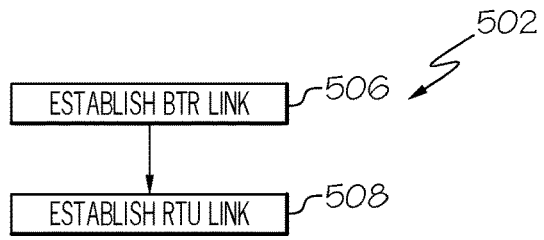
FIG. 17 is a flow diagram of one embodiment of the method for generating the forward link.

Referring to FIG. 17, and with reference to FIGS. 3, 5, 6 and 16, in one example implementation of the disclosed method 500, the step of generating the forward link 102 (block 502) includes the steps of establishing the BTR link 112, as shown at block 506, and establishing the RTU link 114, as shown at block 508.

Figure 18:
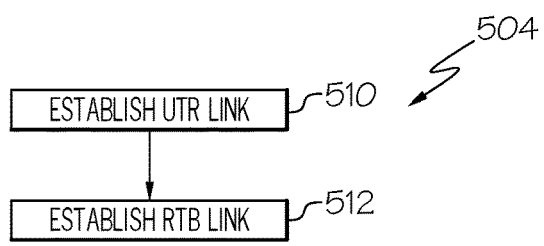
FIG. 18 is a flow diagram of one embodiment of the method for generating the return link.

Referring to FIG. 18, and with reference to FIGS. 4, 7, 8 and 16, the method 500 (e.g., the step of generating the return link 104) (block 504) includes the steps of establishing the UTR link 116, as shown at block 510, and establishing the RTB link 118, as shown at block 512.

Figure 19:
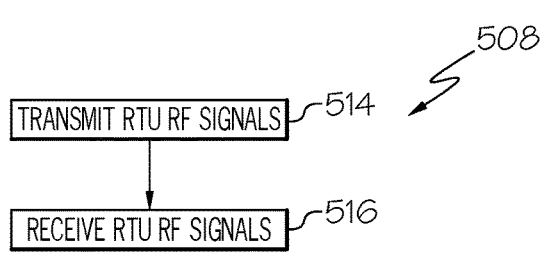
FIG. 19 is a flow diagram of one embodiment of the method for establishing a relay-to-user link.

Referring to FIG. 19, and with reference to FIGS. 3, 5, 6, 16 and 17, in one example implementation of the disclosed method 500, the step of establishing the RTU link 114 (block 508) includes the steps of transmitting, from the plurality of relay platforms 110, the plurality of RTU RF signal 158, as shown at block 514, and receiving, by the user terminal 108, the plurality of RTU RF signals 158, as shown at block 516. Each one of the plurality of RTU links 114 includes the RTU RF signal 158 that is encoded with a different base-to-user data sub-stream 156. Thus, the plurality of RTU RF signals 158 transmit the plurality of BTU data sub-streams 156 to the user terminal 108.

Figure 20:
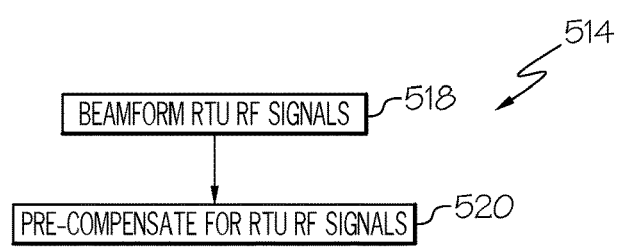
FIG. 20 is a flow diagram of one embodiment of the method for transmitting a relay-to-user radio frequency signal.

Referring to FIG. 20, and with reference to FIGS. 2, 3, 5, 6, 16, 17 and 19, in one example implementation of the disclosed method 500, the step of transmitting the plurality of RTU RF signal 158 (block 514) includes the steps of beamforming, by the beamformer 184, each one of the plurality of RTU RF signals 158 into a shaped and directed RF beam 136 covering the service area 138, as shown at block 518.

The plurality of RF beams 136 (e.g., at least two or more RF beams 136) at least partially overlaps covering the common service area 148. The user terminal 108 is located within the common service area 148. Each one of the plurality of RTU RF signals 158 includes a different RTU frequency 160.

In one example implementation of the disclosed method 500, the step of transmitting the plurality of RTU RF signal 158 (block 514) also includes the step of pre-compensating, by the signal coordinator 186, for at least one of a time delay, a phase alignment and a spatial position of the plurality of (e.g., each one of) RTU RF signals 158, as shown at block 520. Pre-compensating for the plurality of RTU RF signals 158 spatially aligns the plurality of RTU RF signals 158 for reception by the user terminal 108 without complex processing.

Throughout the disclosure, various components of the disclosed communication system 100 are described as "modules". For the purpose of the present disclosure, the term module may include hardware, software or a combination of hardware and software. As one example, a module may include a processor, a storage device (e.g., a memory), an input device and/or a display. The module may also include a computer-readable storage medium having instructions that, when executed by the processor causes the processor to perform or execute the described functions.

Figure 21:
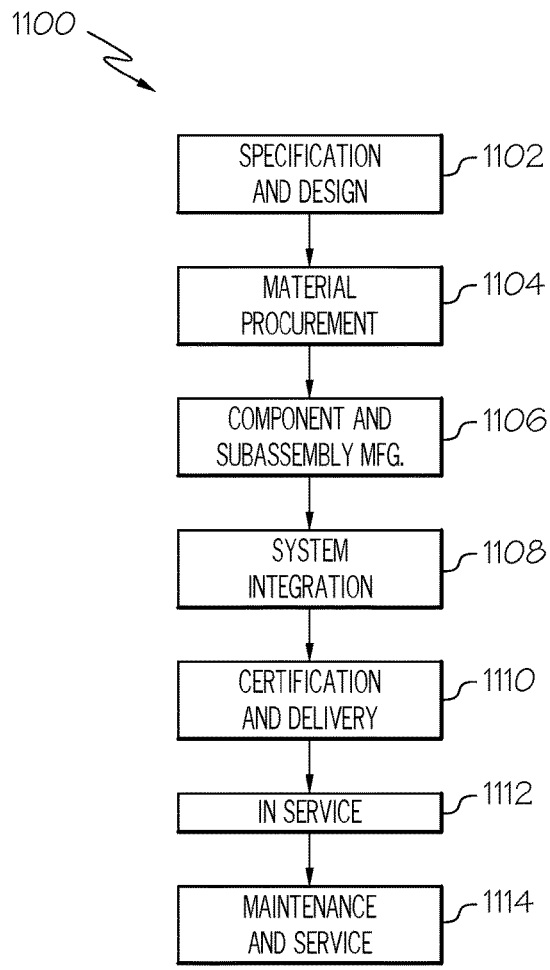
FIG. 21 is a block diagram of aircraft production and service methodology.
Figure 22:
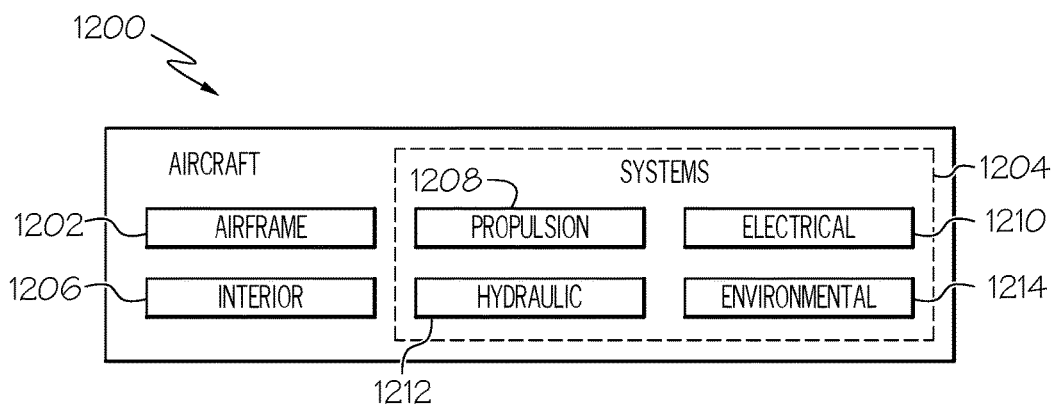
FIG. 22 is a schematic illustration of an aircraft.

Examples of communications system 100 and, particularly, the relay platforms 110, disclosed herein may be described in the context of aircraft manufacturing and service method 1100 as shown in FIG. 21 and an aircraft 1200 as shown in FIG. 22. The aircraft 1200 may be one example of the high altitude aerial platform 128 of the relay platform 110 (FIGS. 11 and 12).

During pre-production, the illustrative method 1100 may include specification and design, as shown at block 1102, of the aircraft 1200, which may include design and implementation of the relay platform 110 and/or the relay platform-RF equipment 166, and material procurement, as shown at block 1104. During production, component and subassembly manufacturing, as shown at block 1106, and system integration, as shown at block 1108, of aircraft 1200 may take place. Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 21, the aircraft 1200 produced by illustrative method 1100 may include airframe 1202, and a plurality of high-level systems 1204 and interior 1206. Examples of high-level systems 1204 include one or more of a propulsion system 1208, an electrical system 1210, a hydraulic system 1212, an environmental system 1214 and an electronics system (e.g., the relay platform-RF equipment 166). Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the systems, apparatus, and methods, or combination thereof may be utilized during production stages (blocks 1108 and 1110). Similarly, one or more examples of the systems, apparatus, and methods, or a combination thereof, may be utilized, for example and without limitation, while aircraft 1200 is in service (block 1112) and during maintenance and service stage (block 1114).

Although various examples of the disclosed communications system and method have been shown and described, modifications may occur to those skilled in the art upon reading the specification. The present application includes such modifications and is limited only by the scope of the claims.

What is claimed is:

1. A communications system comprising:
   radio frequency equipment comprising:
      a multiple-input multiple-output orthogonal frequency division multiplexing system operable to wirelessly communicate radio frequency signals encoded with a base-to-user data stream from a base station to a user terminal; and
      a signal coordinator operable to control a phase and an amplitude of said radio frequency signals transmitted by said multiple-input multiple-output orthogonal frequency division multiplexing system;
   a first airborne communications relay platform configured to receive a first base-to-relay radio frequency signal encoded with a first base-to-user data sub-stream of said base-to-user data stream from said base station and transmit a first relay-to-user radio frequency signal encoded with said first base-to-user data sub-stream of said base-to-user data stream to said user terminal; and
   a second airborne communications relay platform configured to receive a second base-to-relay radio frequency signal encoded with a second base-to-user data sub-stream of said base-to-user data stream from said base station and transmit a second relay-to-user radio frequency signal encoded with said second base-to-user data sub-stream of said base-to-user data stream to said user terminal; and
   wherein said phase and said amplitude of said first base-to-relay radio frequency signal and said second base-to-relay radio frequency signal are selected to pre-compensate for time delay, phase alignment, and spatial positioning of said first base-to-relay radio frequency signal and said second base-to-relay radio frequency signal so that said first base-to-relay radio frequency signal and said second base-to-relay radio frequency signal are spatially aligned at said user terminal and said first base-to-user data sub-stream and said second base-to-user data sub-stream are combined as received by said user terminal.

2. The system of claim 1 wherein said radio frequency equipment is distributed among base station-radio frequency equipment on said base station, relay platform-radio frequency equipment onboard said first airborne communications relay platform and said second airborne communications relay platform, and user terminal-radio frequency equipment on said user terminal.

3. The system of claim 2 wherein:
   said relay platform-radio frequency equipment comprises a multiple-input multiple-output orthogonal frequency division multiplexing transmitter to transmit said first relay-to-user radio frequency signal and said second relay-to-user radio frequency signal to said user terminal; and said user terminal-radio frequency equipment comprises multiple-input multiple-output orthogonal frequency division multiplexing receiver to receive said first relay-to-user radio frequency signal from said first airborne communications relay platform and said second relay-to-user radio frequency signal from said second airborne communications relay platform.

4. The system of claim 1 wherein said first base-to-relay radio frequency signal and said second base-to-relay radio frequency signal have different frequencies.

5. The system of claim 1 wherein said first relay-to-user radio frequency signal and said second relay-to-user radio frequency signal at least partially overlap forming a common service area, and wherein said user terminal is located within said common service area.

6. The system of claim 1 wherein said first relay-to-user radio frequency signal and said second relay-to-user radio frequency signal have different frequencies.

7. The system of claim 1 wherein each one of said first airborne communications relay platform and said second airborne communications relay platform comprise a high altitude aerial platform.

8. The system of claim 1 wherein each one of said first airborne communications relay platform and said second airborne communications relay platform comprise an unmanned areal vehicle traveling along a predetermined flight path at an altitude of between approximately 12 kilometers and approximately 55 kilometers.

9. The system of claim 8 wherein each one of said first airborne communications relay platform and said second airborne communications relay platform travels along a predetermined flight path at an altitude of between approximately 12 kilometers and approximately 55 kilometers.

10. The system of claim 1 wherein said signal coordinator is operable to select said phase and said amplitude of said radio frequency signals transmitted by said multiple-input multiple-output orthogonal frequency division multiplexing system based on a path of each one of said radio frequency signals from a corresponding one of said first airborne communications relay platform and said second airborne communications relay platform to said user terminal to pre-compensate for said time delay, said phase alignment, and said spatial positioning of said first base-to-relay radio frequency signal and said second base-to-relay radio frequency signal.

11. A communications system comprising:
a base station comprising base station-radio frequency equipment configured to transmit a first base-to-relay radio frequency signal encoded with a first base-to-user data sub-stream of a base-to-user data stream and a second base-to-relay radio frequency signal encoded with a second base-to-user data sub-stream of said base-to-user data stream;
a first airborne communications relay platform comprising first relay platform-radio frequency equipment, comprising:
a first relay platform-multiple-input multiple-output orthogonal frequency division multiplexing receiver configured to receive said first base-to-relay radio frequency signal from said base station; and
a first relay platform-multiple-input multiple-output orthogonal frequency division multiplexing transmitter configured to transmit a first relay-to-user radio frequency signal encoded with said first base-to-user data sub-stream of said base-to-user data stream to a user terminal; and
a second airborne communications relay platform relay platform-radio frequency equipment, comprising:
a second relay platform-multiple-input multiple-output orthogonal frequency division multiplexing receiver configured to receive said second base-to-relay radio frequency signal from said base station; and
a second relay platform-multiple-input multiple-output orthogonal frequency division multiplexing transmitter configured to transmit a second relay-to-user radio frequency signal encoded with said second base-to-user data sub-stream of said base-to-user data stream to said user terminal; and
a signal coordinator operable to control a first phase and a first amplitude of said first relay-to-user radio frequency signal, transmitted by said first relay platform-multiple-input multiple-output orthogonal frequency division multiplexing transmitter and to control a second phase and a second amplitude of said second relay-to-user radio frequency signal, transmitted by said second relay platform-multiple-input multiple-output orthogonal frequency division multiplexing transmitter;
wherein said first phase and said first amplitude said first base-to-relay radio frequency signal and said second phase and said second amplitude of said second base-to-relay radio frequency signal are selected to pre-compensate for time delay, phase alignment, and spatial positioning of said first base-to-relay radio frequency signal and said second base-to-relay radio frequency signal so that said first base-to-relay radio frequency signal and said second base-to-relay radio frequency signal are spatially aligned at said user terminal and said first base-to-user data sub-stream and said second base-to-user data sub-stream are combined as received by said user terminal.

12. The system of claim 11 further comprising a beam-former to shape and direct said first relay-to-user radio frequency signal into a first radio frequency beam and said second relay-to-user radio frequency signal into a second radio frequency beam, wherein said first radio frequency beam and said second radio frequency beam at least partially overlap covering a common service area, and wherein said user terminal is located within said common service area.

13. The system of claim 12 wherein said first relay-to-user radio frequency signal and said second relay-to-user radio frequency signal have different frequencies.

14. The system of claim 11 further comprising said user terminal comprising user terminal-radio frequency equipment, comprising a user terminal-multiple-input multiple-output orthogonal frequency division multiplexing receiver configured to receive said first relay-to-user radio frequency signal from said first airborne communications relay platform and to receive said second relay-to-user radio frequency signal from said second airborne communications relay platform.

15. The system of claim 14 wherein said base station-radio frequency equipment comprises a base-station multiple-input multiple-output orthogonal frequency division multiplexing transmitter configured to transmit said first base-to-relay radio frequency signal to said first airborne communications relay platform and to transmit said second base-to-relay radio frequency signal to said second airborne communications relay platform.

16. The system of claim 11 wherein each one of said first airborne communications relay platform and said second airborne communications relay platform comprise a high altitude aerial platform.

17. The system of claim 11 further comprising a second base station configured to transmit said first base-to-relay radio frequency signal encoded with said first base-to-user data sub-stream of said base-to-user data stream and said second base-to-relay radio frequency signal encoded with said second base-to-user data sub-stream of said base-to-user data stream; and wherein:
  said first base station transmits one of said first base-to-relay radio frequency signal to said first airborne communications relay platform or said second base-to-relay radio frequency signal to said second airborne communications relay platform; and
  said second base station transmits an alternate one of said first base-to-relay radio frequency signal to said first airborne communications relay platform or said second base-to-relay radio frequency signal to said second airborne communications relay platform.

18. A method comprising:
  transmitting, by a base station, a first base-to-relay radio frequency signal encoded with a first base-to-user data sub-stream of said base-to-user data stream and a second base-to-relay radio frequency signal encoded with a second base-to-user data sub-stream of said base-to-user data stream;
  receiving, by a first airborne communications relay platform in communication with said base station, said first base-to-relay radio frequency signal;
  receiving, by a second airborne communications relay platform in communication with said base station, said second base-to-relay radio frequency signal;
  transmitting, from said first airborne communications relay platform, a first relay-to-user radio frequency signal encoded with said first base-to-user data sub-stream of said base-to-user data stream;
  transmitting, from said second airborne communications relay platform, a second relay-to-user radio frequency signal encoded with said second base-to-user data sub-stream of said base-to-user data stream;
  selecting a first phase and a first amplitude for said first relay-to-user radio frequency signal and a second phase and a second amplitude for said relay-to-user radio frequency signal to pre-compensate for time delay, phase alignment, and spatial positioning of said first base-to-relay radio frequency signal and said second base-to-relay radio frequency signal;
  spatially aligning said first relay-to-user radio frequency signal and said second relay-to-user radio frequency signal in space at a user terminal in communication with said first airborne communications relay platform and said second airborne communications relay platform; and
  combining said first base-to-user data sub-stream and said second base-to-user data sub-stream as received by said user terminal.

19. The method of claim 18 further comprising beam-forming said first relay-to-user radio frequency signal into a first radio frequency beam and said second relay-to-user radio frequency signal into a second radio frequency beam, wherein said first radio frequency beam and said second radio frequency beam at least partially overlap covering a common service area, and wherein said user terminal is located within said common service area.

20. The method of claim 19 wherein said first relay-to-user radio frequency signal and said second relay-to-user radio frequency signal have different frequencies.

* * * * *